United States Patent
Fukui et al.

(10) Patent No.: US 8,010,836 B2
(45) Date of Patent: Aug. 30, 2011

(54) STORAGE CONFIGURATION RECOVERY METHOD AND STORAGE MANAGEMENT SYSTEM

(75) Inventors: Yoshiki Fukui, Yokohama (JP); Takuya Okamoto, Machida (JP); Nobuo Beniyama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 534 days.

(21) Appl. No.: 12/099,936

(22) Filed: Apr. 9, 2008

(65) Prior Publication Data

US 2009/0199041 A1    Aug. 6, 2009

(30) Foreign Application Priority Data

Feb. 6, 2008    (JP) .................................. 2008-026108

(51) Int. Cl.
*G06F 11/00* (2006.01)
(52) U.S. Cl. ......................................................... 714/6.3
(58) Field of Classification Search .................. 714/2–9, 714/12, 13, 15, 16, 20, 21, 39, 42, 56
See application file for complete search history.

(56) References Cited

U.S. PATENT DOCUMENTS

| | | | | |
|---|---|---|---|---|
| 6,880,052 | B2 * | 4/2005 | Lubbers et al. ............... | 711/162 |
| 7,149,859 | B2 * | 12/2006 | Fujibayashi .................. | 711/162 |
| 7,549,080 | B1 * | 6/2009 | Gardner et al. ................... | 714/6 |
| 7,640,451 | B2 * | 12/2009 | Meyer et al. ...................... | 714/4 |
| 2002/0188711 | A1 * | 12/2002 | Meyer et al. .................. | 709/223 |
| 2005/0268147 | A1 * | 12/2005 | Yamamoto et al. ............... | 714/2 |
| 2006/0010341 | A1 | 1/2006 | Kodama | |
| 2006/0047712 | A1 * | 3/2006 | Shitomi et al. ................ | 707/202 |
| 2006/0117212 | A1 * | 6/2006 | Meyer et al. ..................... | 714/4 |
| 2008/0005288 | A1 * | 1/2008 | Kodama et al. ............... | 709/220 |

* cited by examiner

*Primary Examiner* — Nadeem Iqbal
(74) *Attorney, Agent, or Firm* — Antonelli, Terry, Stout & Kraus, LLP.

(57) ABSTRACT

When failure occurs in a virtualization apparatus in storage network circumstances in which the virtualization apparatus is operated, a storage management server judges volume position information, cache configuration information and pair configuration information which are configuration information of the virtualization apparatus and external storage collectively to decide candidates of recovery methods of volume and candidates of recovery methods of data in the volume, so that construction of a physical volume and a pair and recovery of data are performed and an access path is then changed to the recovered physical primary volume. Consequently, change to the system configuration in which operation is performed without passing through the virtualization apparatus can be made in a short time and continuous operation can be attained.

19 Claims, 30 Drawing Sheets

FIG. 6

800 VOLUME POSITION INFORMATION

| 80001 VIRTUALIZATION APPARATUS IDENTIFIER | 80002 VIRTUAL VOLUME IDENTIFIER | 80003 PHYSICAL APPARATUS IDENTIFIER | 80004 PHYSICAL VOLUME IDENTIFIER | |
|---|---|---|---|---|
| USP1 | V-VOL1 | USP1 | R-VOL1 | 80050 |
| USP1 | V-VOL2 | USP1 | R-VOL2 | 80051 |
| USP1 | V-VOL3 | USP1 | R-VOL3 | 80052 |
| USP1 | V-VOL4 | USP1 | R-VOL4 | 80053 |
| USP1 | V-VOL5 | DF1 | R-VOL1 | 80054 |
| USP1 | V-VOL6 | DF1 | R-VOL2 | 80055 |
| USP1 | V-VOL7 | DF1 | R-VOL3 | 80056 |
| USP1 | V-VOL8 | DF2 | R-VOL1 | 80057 |
| USP1 | V-VOL9 | DF2 | R-VOL2 | 80058 |

BEFORE RECOVERY

⇩

| 80001 VIRTUALIZATION APPARATUS IDENTIFIER | 80002 VIRTUAL VOLUME IDENTIFIER | 80003 PHYSICAL APPARATUS IDENTIFIER | 80004 PHYSICAL VOLUME IDENTIFIER | |
|---|---|---|---|---|
| USP1 | V-VOL1 | - | - | 80060 |
| USP1 | V-VOL2 | DF1 | R-VOL2 | 80061 |
| USP1 | V-VOL3 | DF1 | R-VOL3 | 80062 |
| USP1 | V-VOL4 | - | - | 80063 |
| USP1 | V-VOL5 | DF1 | R-VOL1 | 80064 |
| USP1 | V-VOL6 | DF1 | R-VOL2 | 80065 |
| USP1 | V-VOL7 | DF2 | R-VOL4 | 80066 |
| USP1 | V-VOL8 | DF2 | R-VOL1 | 80067 |
| USP1 | V-VOL9 | DF2 | R-VOL2 | 80068 |

AFTER RECOVERY

FIG. 7A

810c PAIR CONFIGURATION INFORMATION

| VIRTUALIZATION APPARATUS IDENTIFIER (81001) | VIRTUAL PRIMARY VOLUME IDENTIFIER (81002) | VIRTUAL SECONDARY VOLUME IDENTIFIER (81003) |
|---|---|---|
| USP1 | V-VOL1 | V-VOL2 |
| USP1 | V-VOL3 | V-VOL4 |
| USP1 | V-VOL5 | V-VOL6 |
| USP1 | V-VOL7 | V-VOL8 |
| USP1 | V-VOL9 | - |

FIG. 7B

810a PAIR CONFIGURATION INFORMATION

| VIRTUALIZATION APPARATUS IDENTIFIER (81001) | VIRTUAL PRIMARY VOLUME IDENTIFIER (81002) | VIRTUAL SECONDARY VOLUME IDENTIFIER (81003) | RECOVERY CANDIDATE (VOLUME RECOVERY METHOD AND DATA RECOVERY METHOD) (81004) |
|---|---|---|---|
| USP1 | V-VOL1 | V-VOL2 | (S21013, UNNECESSARY) |
| USP1 | V-VOL3 | V-VOL4 | (S21012, S23007) |
| USP1 | V-VOL5 | V-VOL6 | (S21017, S23008), (S21019, S23004), (S21022, S23007) |
| USP2 | V-VOL7 | V-VOL8 | (S21017, S23008), (S21019, S23004) |
| USP2 | V-VOL9 | - | (S21005, UNNECESSARY) |
| USP2 | V-VOL2 | - | NONE |

FIG. 8

820 CACHE CONFIGURATION INFORMATION

| VIRTUALIZATION APPARATUS IDENTIFIER (82001) | VIRTUAL VOLUME IDENTIFIER (82002) | CACHE UTILIZATION (82003) |
|---|---|---|
| USP1 | V-VOL1 | yes |
| USP1 | V-VOL2 | no |
| USP1 | V-VOL3 | yes |
| USP1 | V-VOL4 | no |
| USP1 | V-VOL5 | yes |
| USP1 | V-VOL6 | no |
| USP1 | V-VOL7 | yes |
| USP1 | V-VOL8 | no |
| USP1 | V-VOL9 | yes |

FIG. 9

830 ACCESS PATH CONFIGURATION INFORMATION

| VIRTUALIZATION APPARATUS IDENTIFIER (83001) | VIRTUAL VOLUME IDENTIFIER (83002) | WORK HOST IDENTIFIER (83003) |
|---|---|---|
| USP1 | V-VOL1 | WORK HOST 1 |
| USP1 | V-VOL2 | WORK HOST 1 |
| USP1 | V-VOL3 | WORK HOST 1 |
| USP1 | V-VOL4 | WORK HOST 1 |
| USP1 | V-VOL5 | WORK HOST 2 |
| USP1 | V-VOL6 | WORK HOST 2 |
| USP1 | V-VOL7 | WORK HOST 2 |
| USP1 | V-VOL8 | WORK HOST 3 |
| USP1 | V-VOL9 | WORK HOST 3 |

FIG. 10

840 SUPPORTED MANIPULATION INFORMATION OF OPERATION MANAGEMENT

| PHYSICAL APPARATUS IDENTIFIER (84001) | PROVISION MANIPULATION NAME (84002) | VIRTUAL PROVISION MANIPULATION NAME (84003) |
|---|---|---|
| DF1 | SHADOW IMAGE | LOCAL COPY |
| DF1 | - | REMOTE COPY |

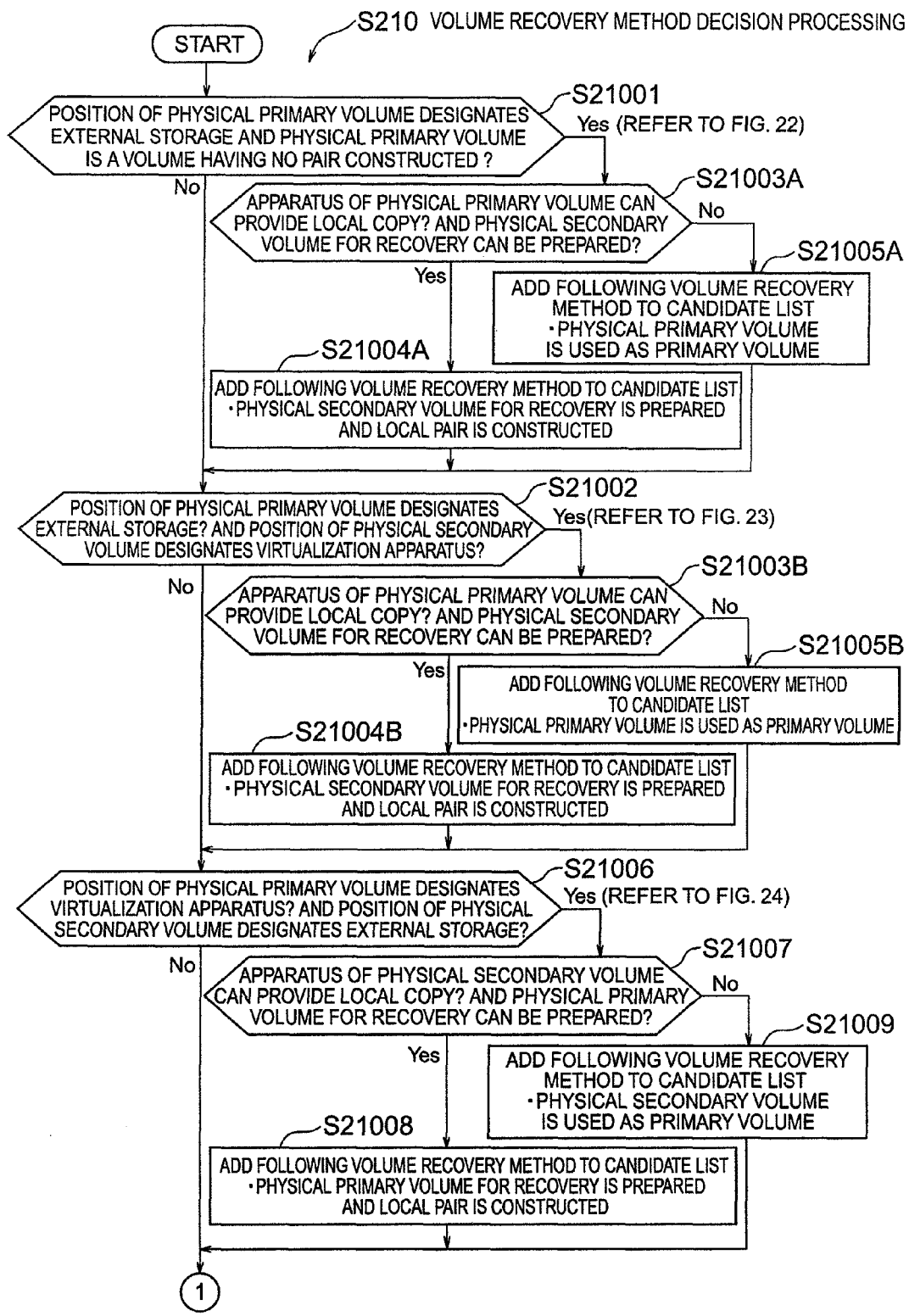

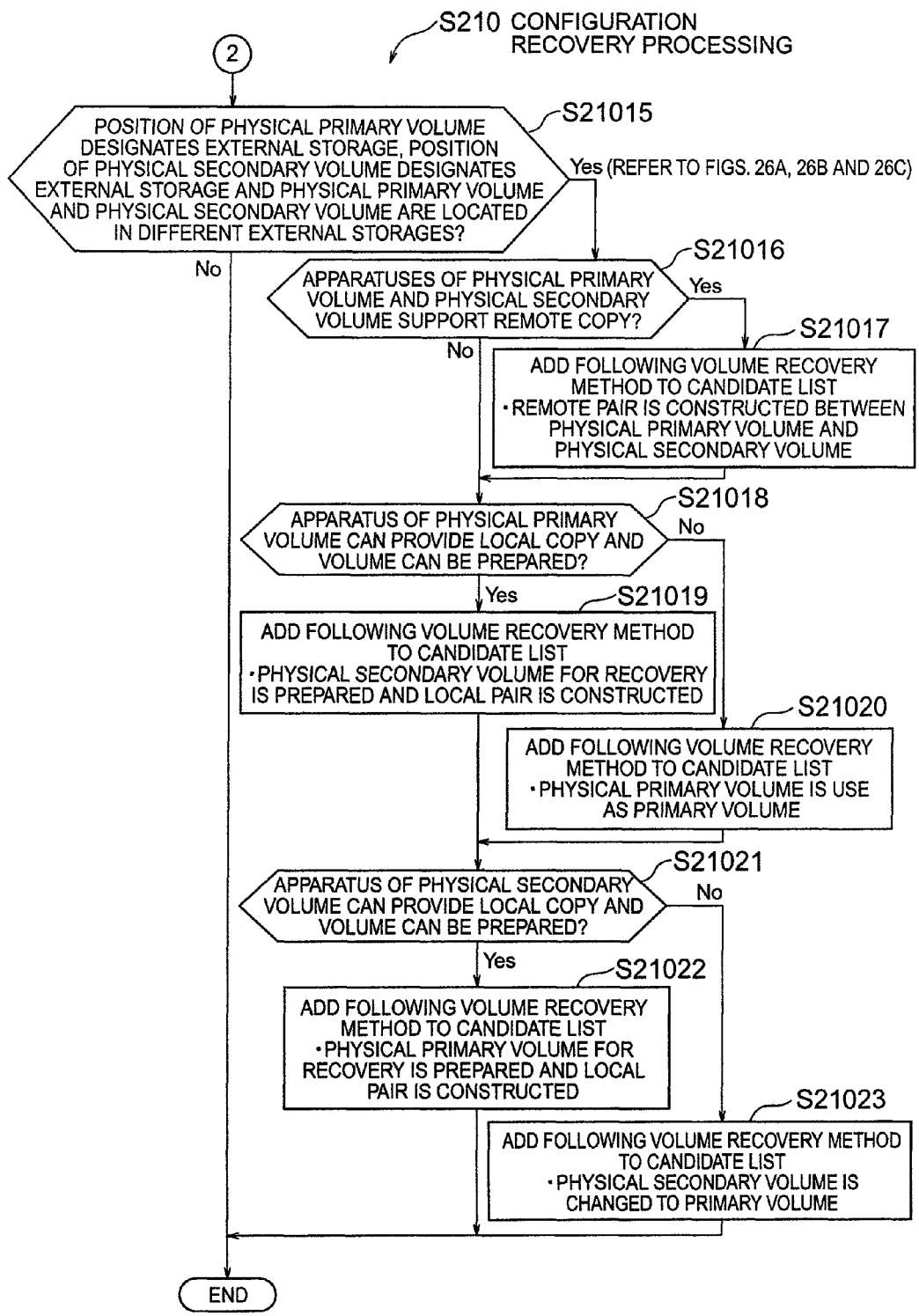

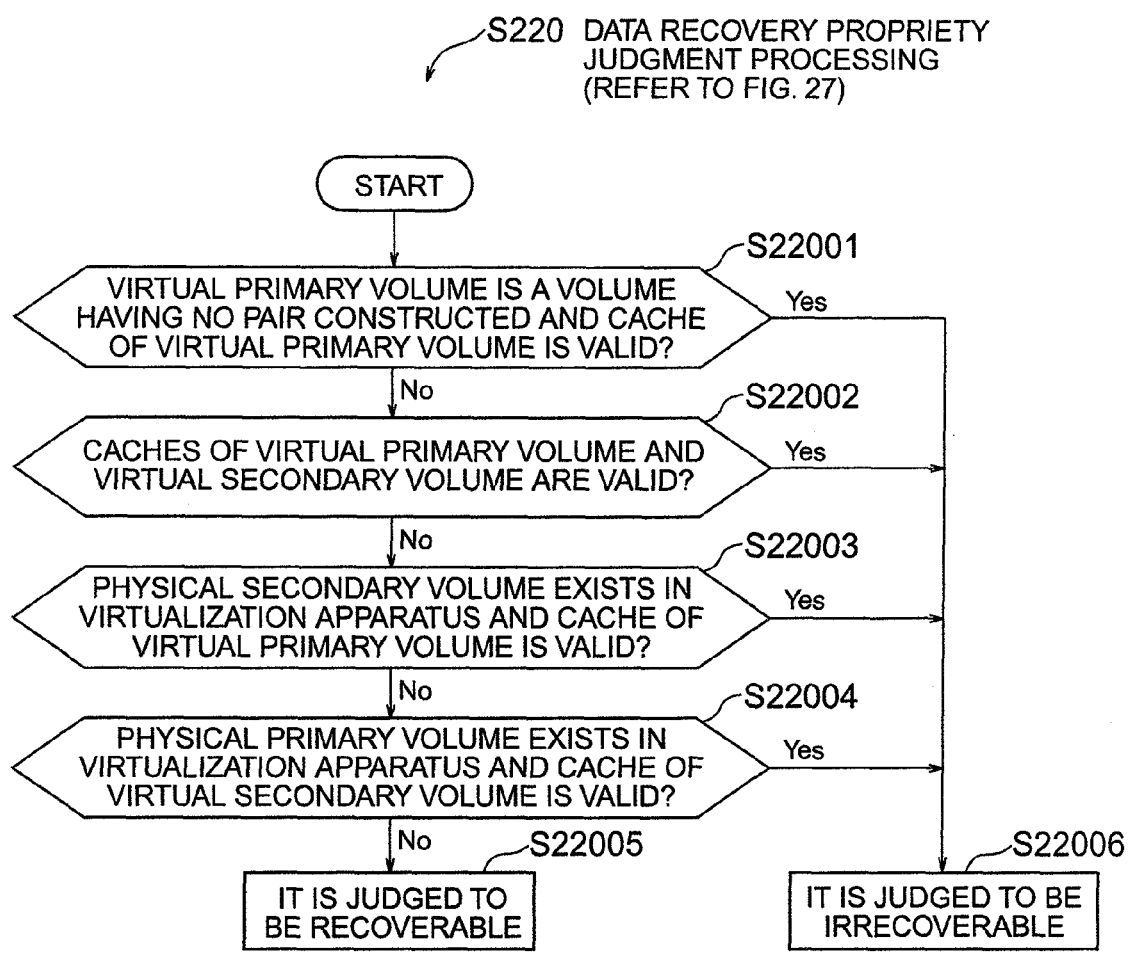

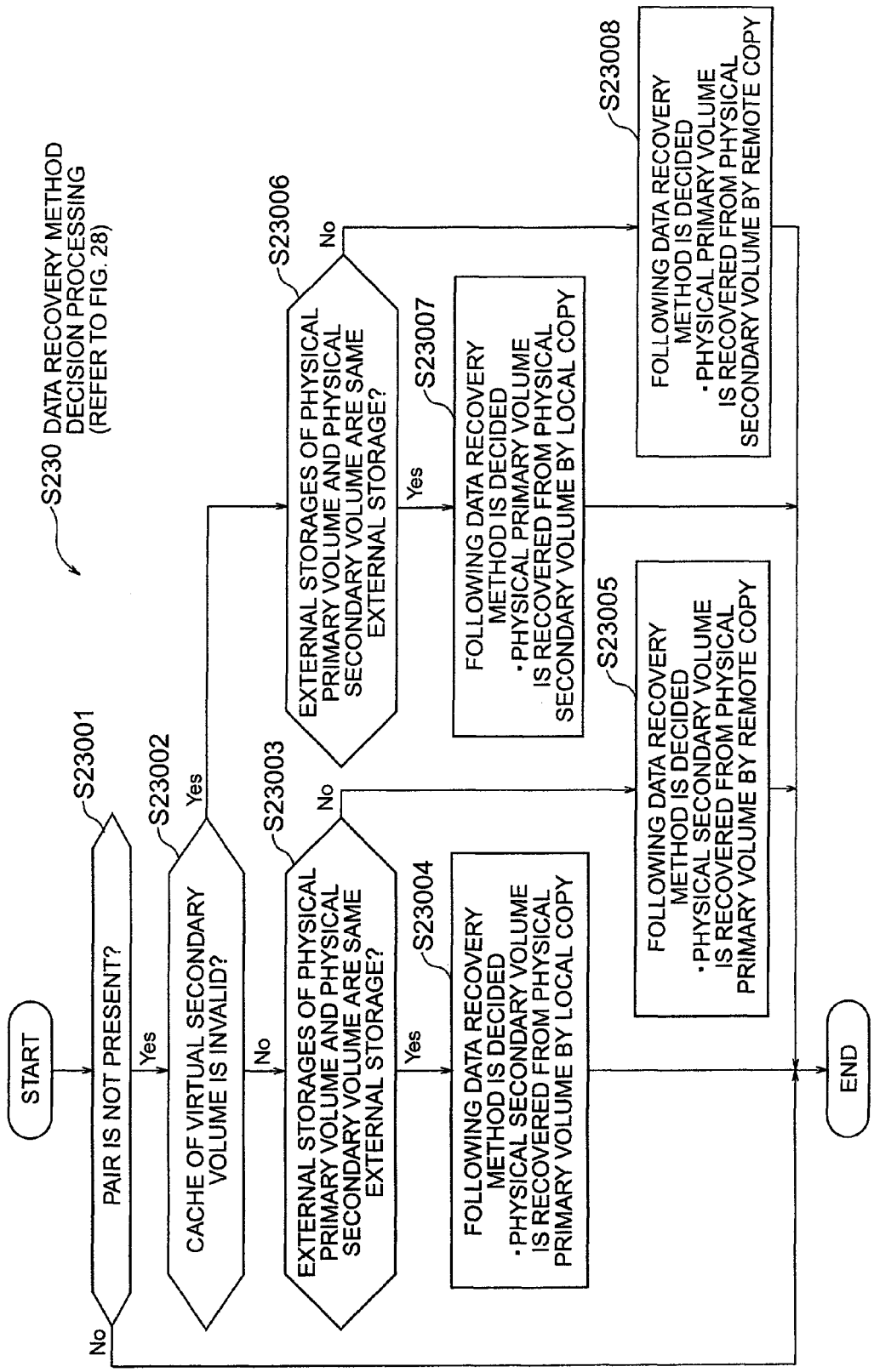

FIG. 20
CONFIGURATION BEFORE RECOVERY
(CORRESPONDING TO YES OF STEP S20001)
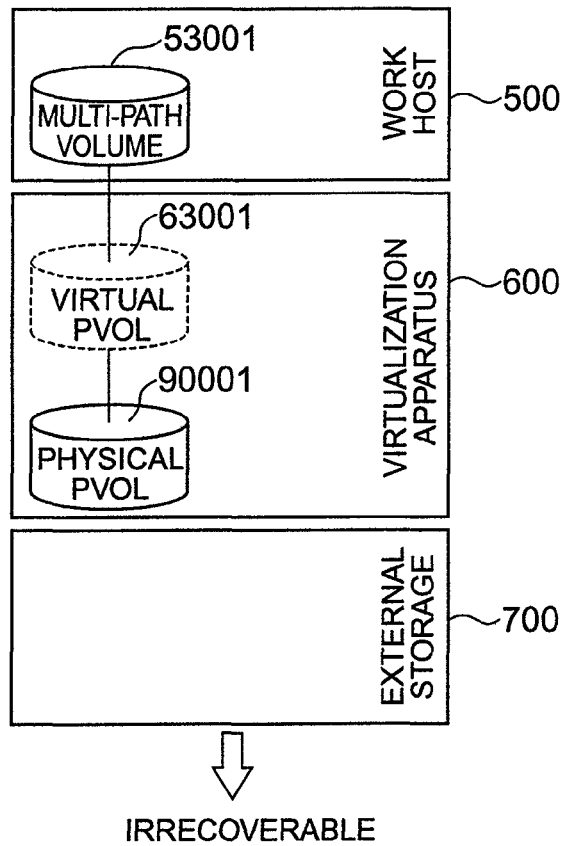
IRRECOVERABLE
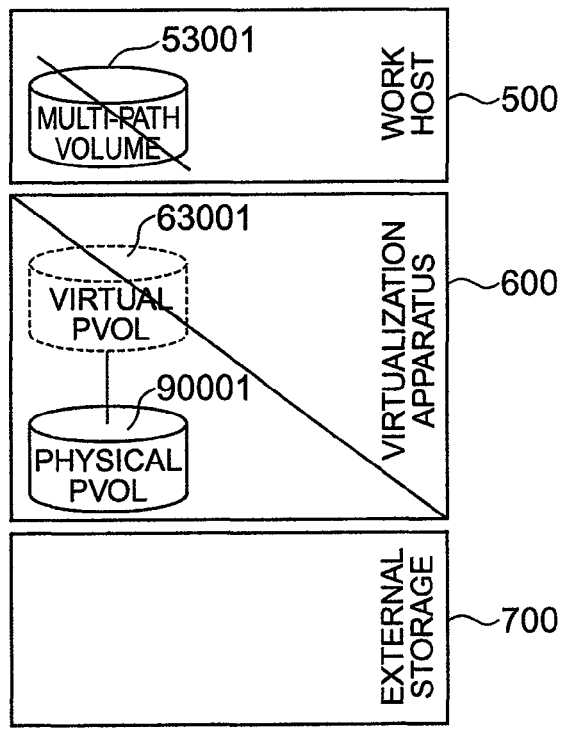

FIG. 21
CONFIGURATION BEFORE RECOVERY
(CORRESPONDING TO YES OF STEP S20002)
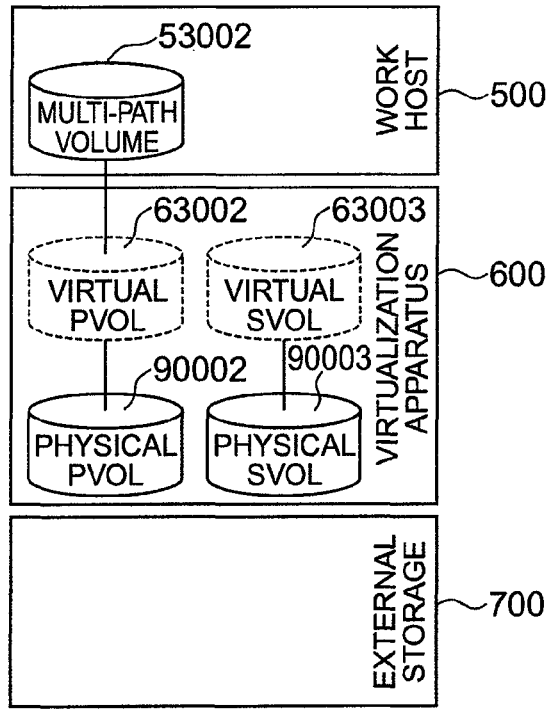
IRRECOVERABLE
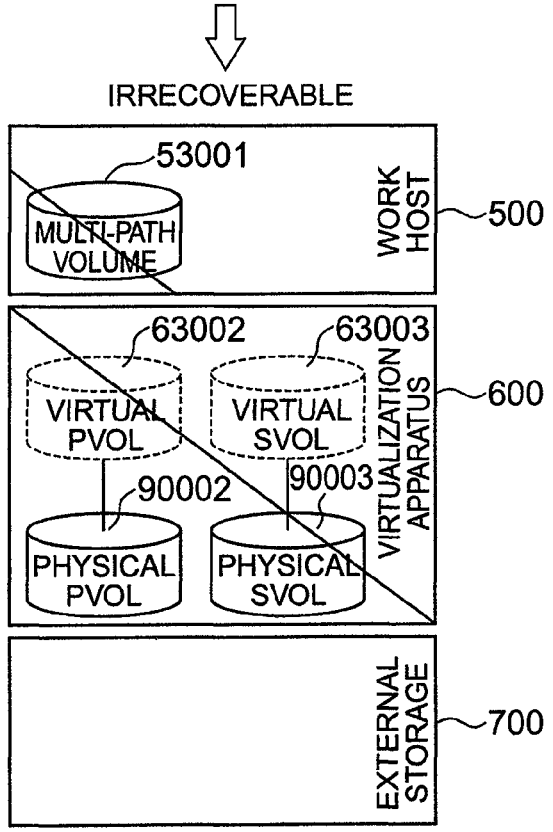

FIG. 22
CONFIGURATION BEFORE RECOVERY
(CORRESPONDING TO YES OF STEP S21001)
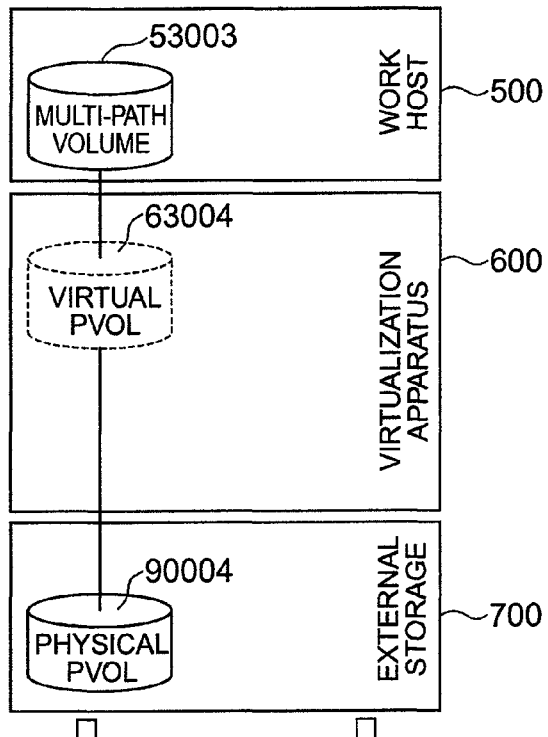
CONFIGURATION OF RECOVERY
CANDIDATE (S21004A)
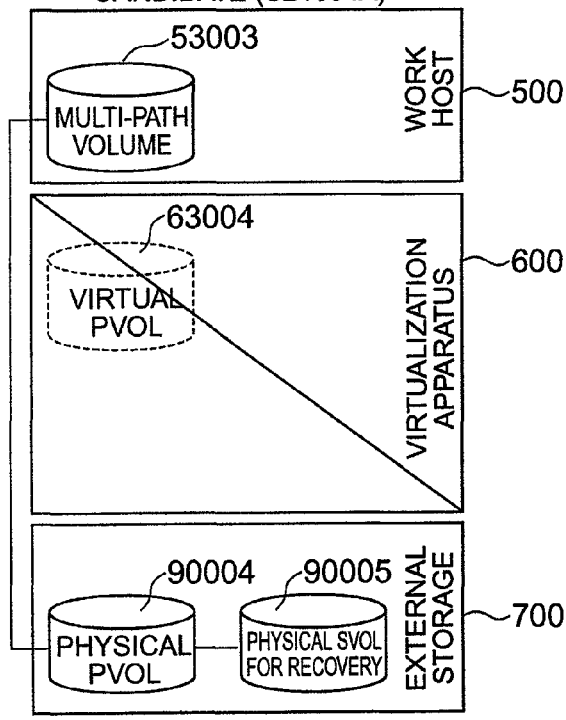
CONFIGURATION OF RECOVERY
CANDIDATE (S21005A)
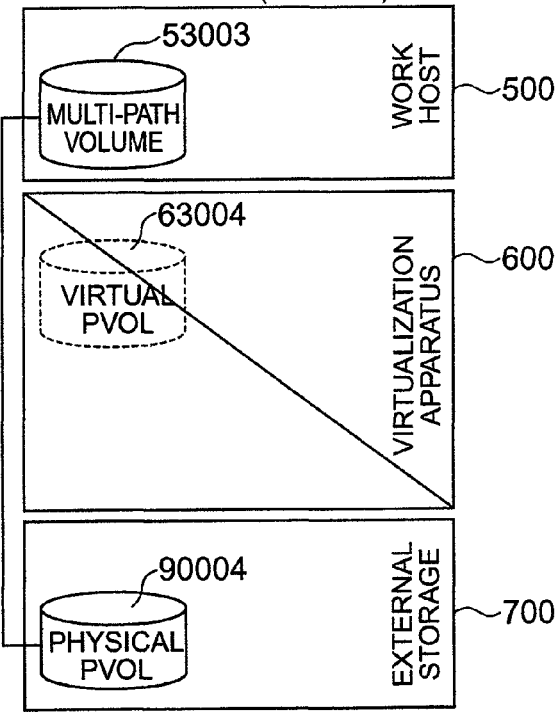

FIG. 23
CONFIGURATION BEFORE RECOVERY
(CORRESPONDING TO YES OF STEP S21002)
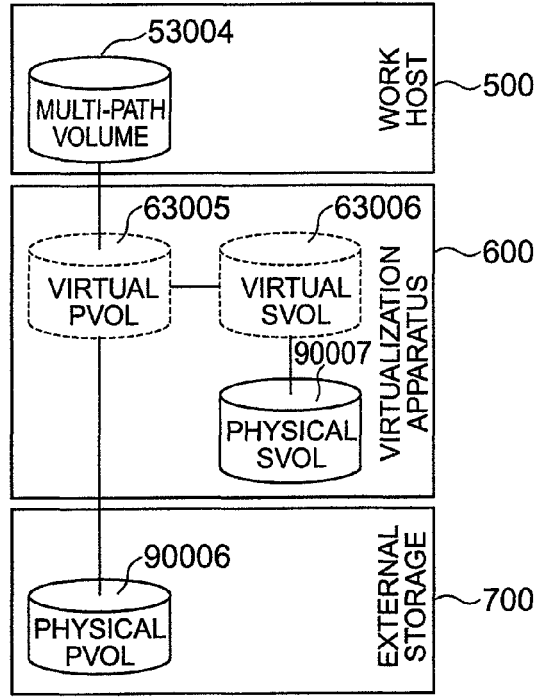
CONFIGURATION OF RECOVERY
CANDIDATE (S21004B)
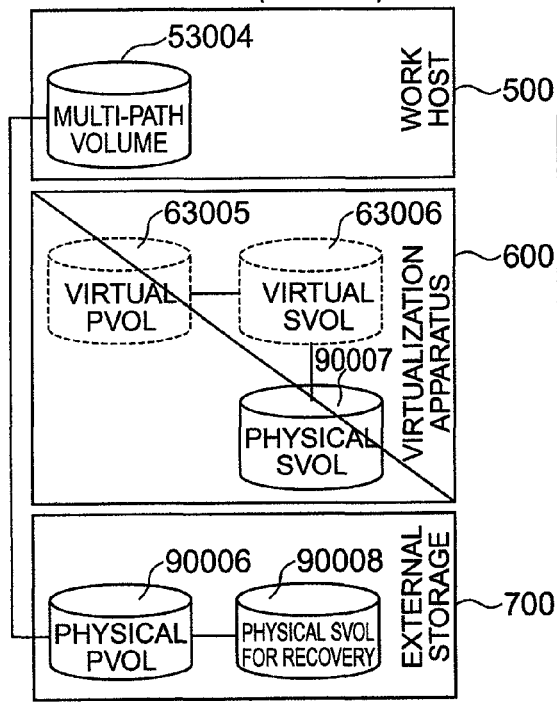
CONFIGURATION OF RECOVERY
CANDIDATE (S21005B)
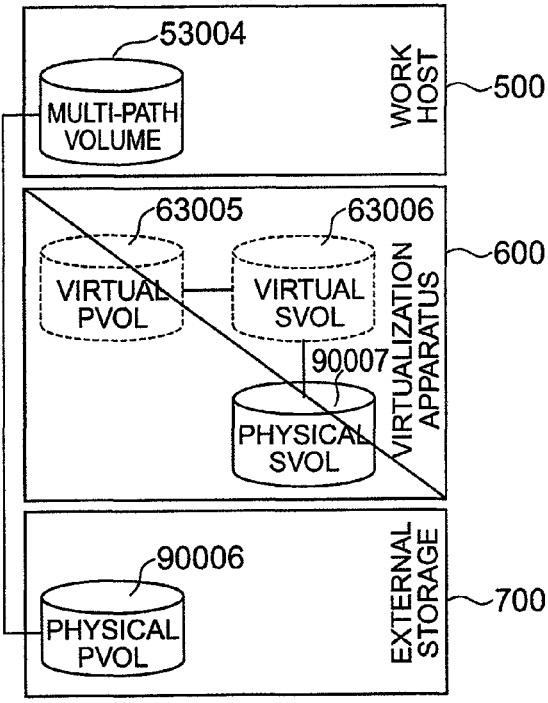

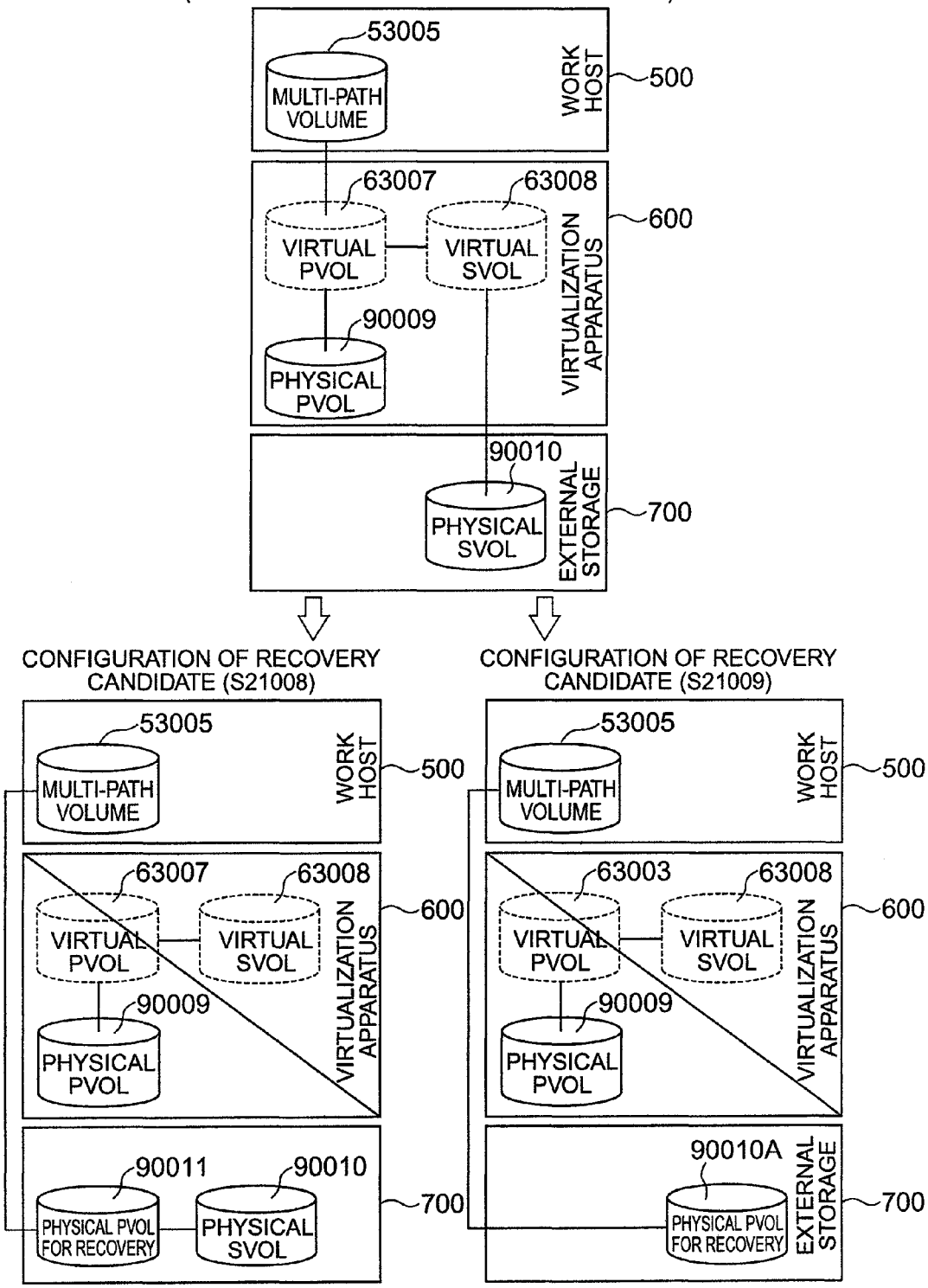

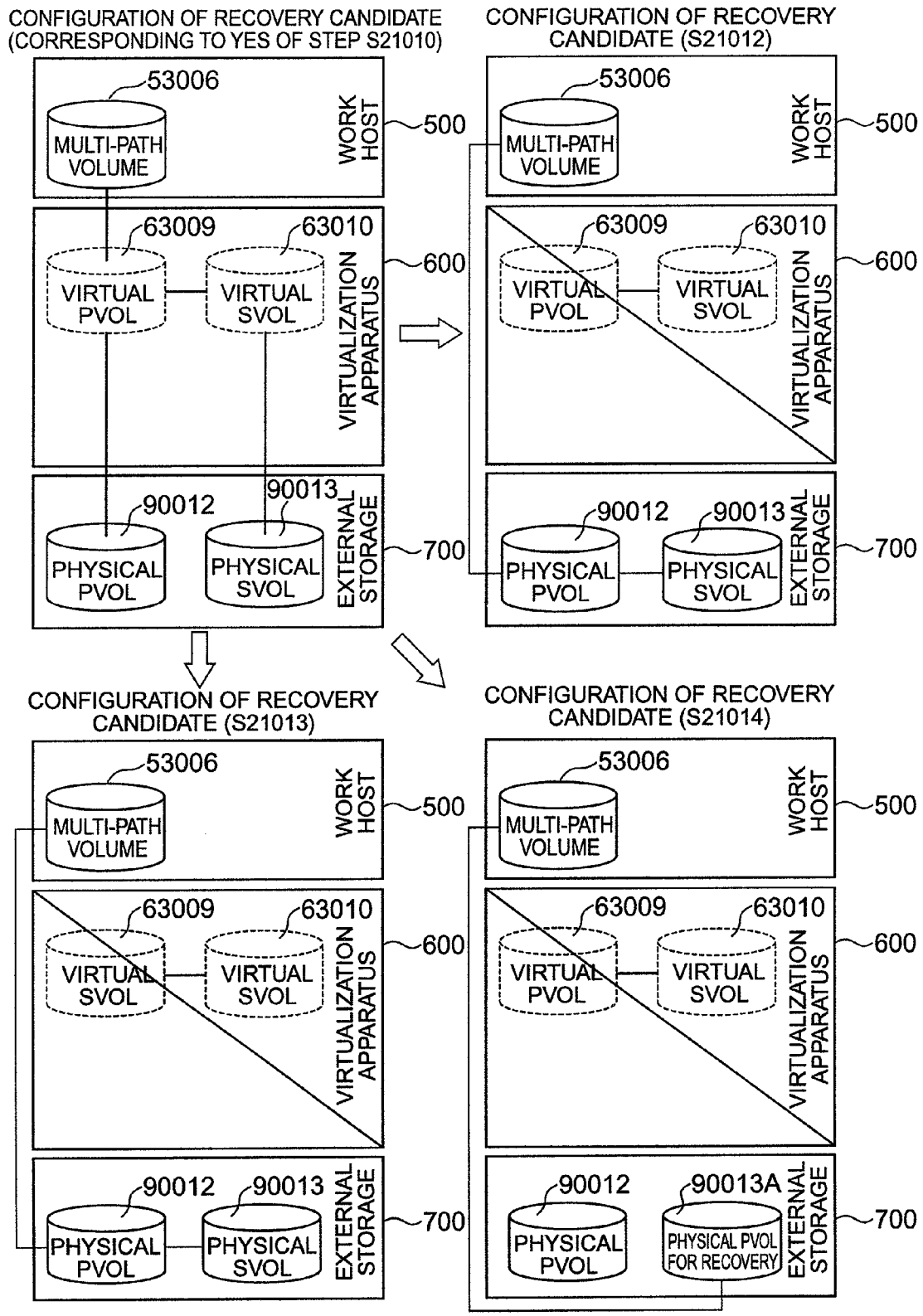

FIG. 26A
CONFIGURATION OF RECOVERY CANDIDATE
(CORRESPONDING TO YES OF STEP S21015)
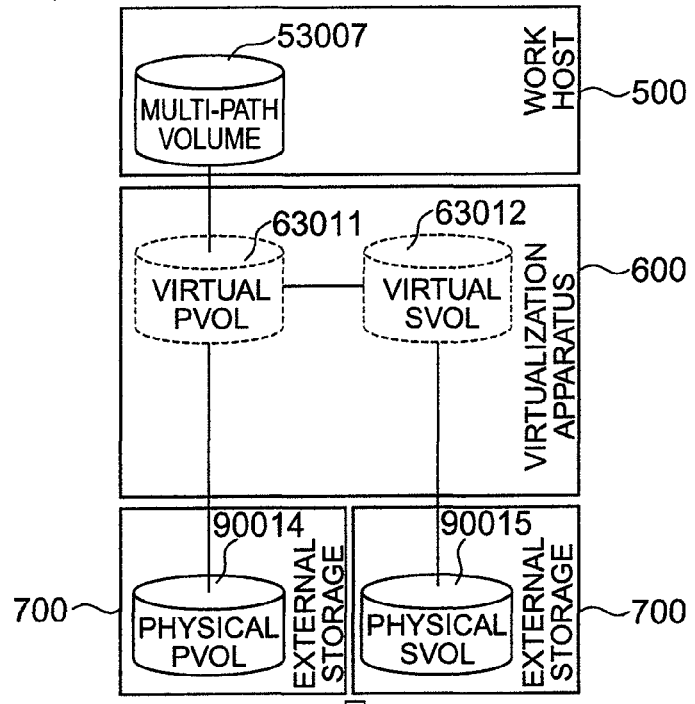
CONFIGURATION OF RECOVERY
CANDIDATE (S21017)
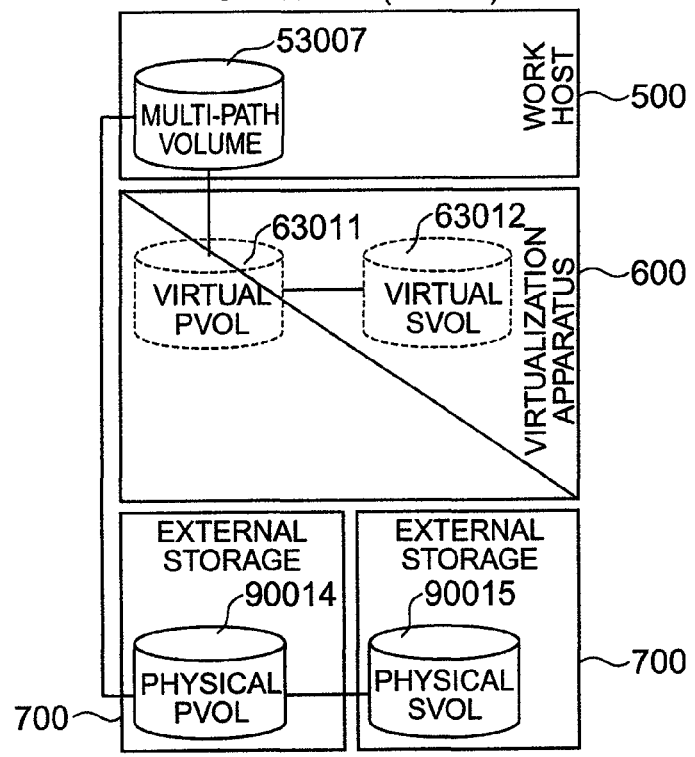

FIG. 26B
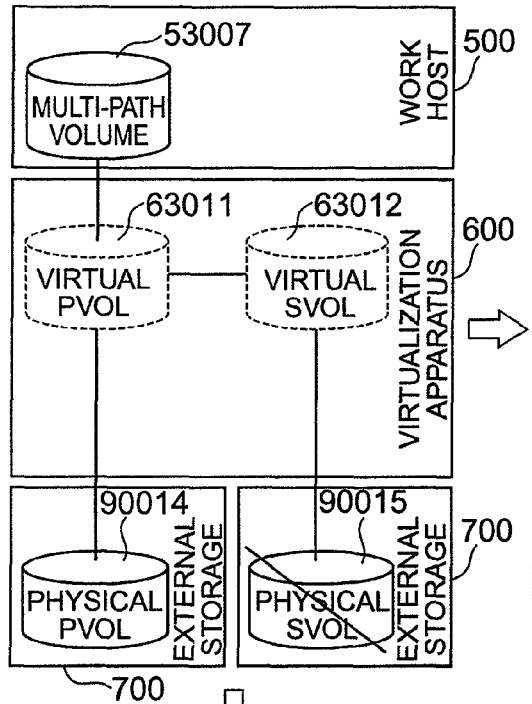
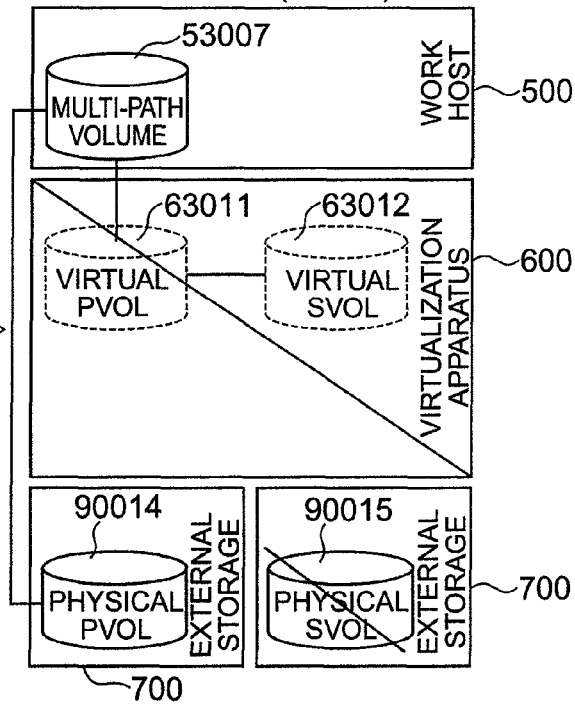
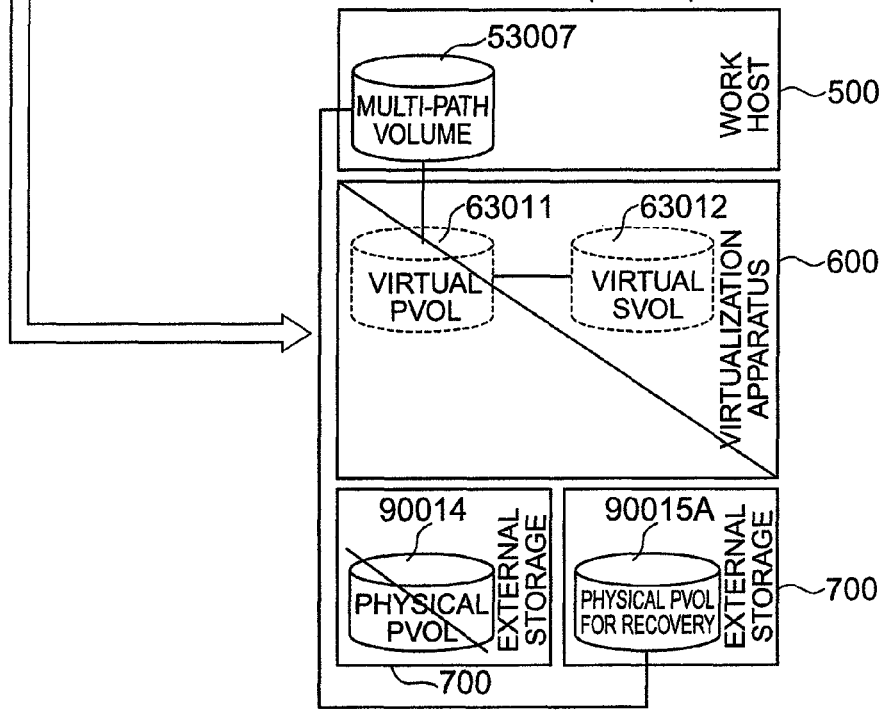

FIG. 26C
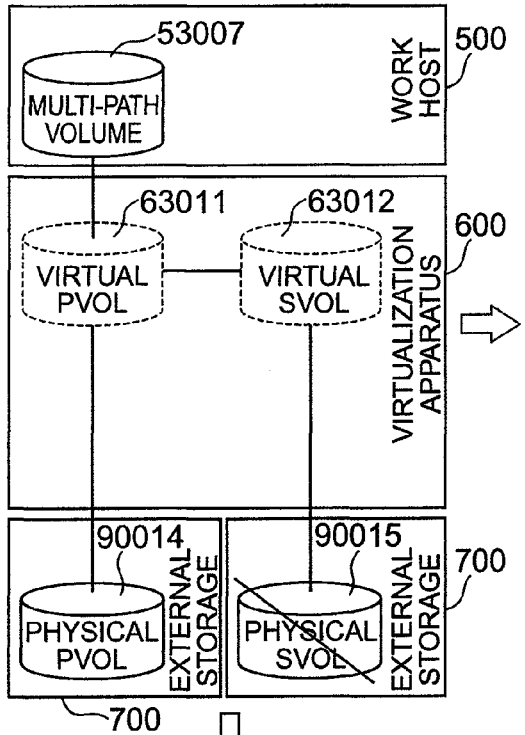
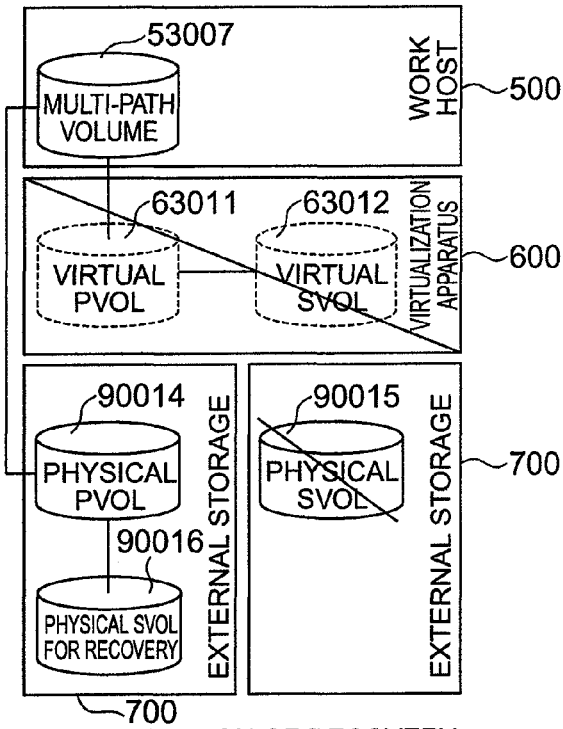
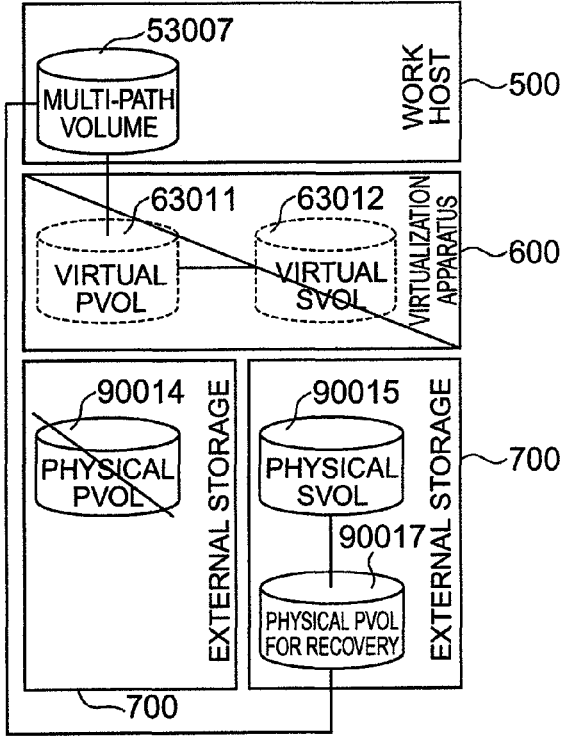

BEFORE RECOVERY (S2201)

BEFORE RECOVERY (S2202)

BEFORE RECOVERY (S2203)

BEFORE RECOVERY (S2204)

CONFIGURATION OF RECOVERY CANDIDATE (S23007)

CONFIGURATION OF RECOVERY CANDIDATE (S23008)

CONFIGURATION OF RECOVERY CANDIDATE (S23004)

CONFIGURATION OF RECOVERY CANDIDATE (S23005)

_US 8,010,836 B2_

STORAGE CONFIGURATION RECOVERY METHOD AND STORAGE MANAGEMENT SYSTEM

INCORPORATION BY REFERENCE

The present application claims priority from Japanese application JP2008-026108 filed on Feb. 6, 2008, the content of which is hereby incorporated by reference into this application.

BACKGROUND OF THE INVENTION

The present invention relates to a storage configuration recovery method and a storage management system useful upon occurrence of failure in a virtualization configuration.

In recent years, the storage virtualization technique in which different kinds of storage apparatuses of various vendors located in Storage Area Network (SAN) circumstances are integrated into one system to improve flexibility and efficiency in operation of storage is being spread. For example, U.S. Patent Application Publication No. 2006/0010341 A1 discloses the virtualization technique of storage controller base which realizes the virtualization function in storage apparatuses and realizes integration of different kinds of storage apparatuses by the external connection function.

SUMMARY OF THE INVENTION

In the system configuration utilizing the virtualization apparatus, however, the virtualization apparatus becomes a single point of failure in the whole system and when failure occurs in the virtualization apparatus in a system configuration in which the virtualization apparatus is not duplicated, it is difficult to recover the virtualization apparatus so that the apparatus can resume operation promptly. This reason is that (1) system configuration information necessary for recovery is lost and (2) recovery measures depending on kinds of storages are required to be selected properly since the function of the virtualization apparatus which integrates different kinds of storage apparatuses flexibly is damaged and combination in the selection is increased enormously. The single point of failure means a weak point that there is only one constituent element (hardware component) of a computer and accordingly when failure occurs therein, operation is stopped.

In order to solve the above problem, it is an object of the present invention to provide a storage configuration recovery method and a storage management system in which change to the storage configuration in which operation is performed without passing through a virtualization apparatus can be made so that operation can be resumed promptly when failure occurs in the virtualization apparatus in the SAN circumstances in which the virtualization apparatus is not duplicated.

According to the present invention, volume recovery is realized using the following measures. A management server (e.g. storage management server 100) (1) gets backup information of system configuration information held in a virtualization apparatus and (2) judges, when failure occurs in the virtualization apparatus, volume position information, cache configuration information and pair configuration information which are configuration information of the virtualization apparatus and external storages collectively to perform recovery of a physical volume, a pair configuration and data by a proper method, so that an access path is changed to the recovered physical primary volume. Consequently, change to the system configuration in which operation is performed without passing through the virtualization apparatus in which failure occurs can be made in a short time and recovery and continuous operation can be attained.

According to the present invention, change to the storage configuration in which operation is performed without passing through a virtualization apparatus can be made, so that operation can be resumed promptly when failure occurs in the virtualization apparatus in the SAN circumstances in which the virtualization apparatus is not duplicated.

Other objects, features and advantages of the invention will become apparent from the following description of the embodiments of the invention taken in conjunction with the accompanying drawings.

BRIEF DESCRIPTION OF THE DRAWINGS

FIG. 6 shows an example of a table of volume position information;

FIGS. 7A and 7B show an example of tables of pair configuration information;

FIG. 8 shows an example of a table of cache configuration information;

FIG. 9 shows an example of a table of access path configuration information;

FIG. 10 shows an example of a table of supported manipulation information of operation management;

FIGS. 14A to 14C are flowcharts showing volume recovery method decision processing;

FIG. 15 is a flowchart showing data recovery propriety judgment processing;

FIG. 16 is a flowchart showing data recovery method decision processing;

FIG. 20 is a schematic diagram illustrating an example of irrecoverable storage configuration in FIG. 13;

FIG. 21 is a schematic diagram illustrating an example of irrecoverable storage configuration in FIG. 13;

FIG. 22 is a schematic diagram illustrating storage configuration and its recovery candidates in FIG. 14A;

FIG. 23 is a schematic diagram illustrating storage configuration and its recovery candidates in FIG. 14A;

FIG. 24 is a schematic diagram illustrating storage configuration and its recovery candidates in FIG. 14A;

FIG. 25 is a schematic diagram illustrating storage configuration and its recovery candidates in FIG. 14B;

FIGS. 26A to 26C are schematic diagrams illustrating storage configuration and its recovery candidates in FIG. 14C;

DESCRIPTION OF THE EMBODIMENT

An embodiment of the present invention is now described in detail with reference to the accompanying drawings.

Figure 1:
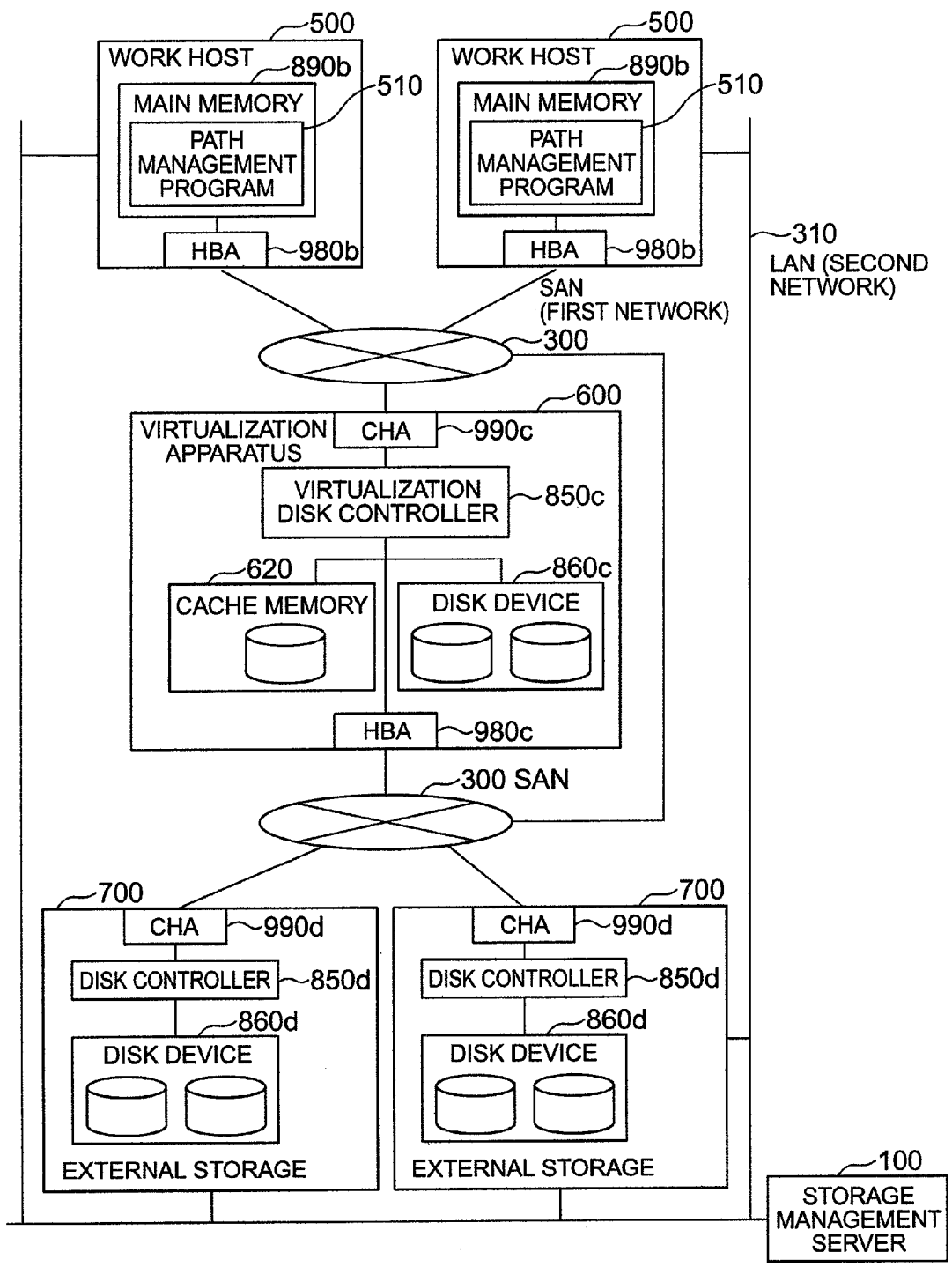
FIG. 1 is a schematic diagram illustrating an example of a storage management system to which the present invention is applied.

FIG. 1 is a schematic diagram illustrating an example of a storage management system to which the present invention is applied. The storage management system includes a management server (hereinafter referred to as "storage management server") 100, a plurality of host computers (hereinafter referred to as "work host") 500, a plurality of data storage apparatuses (hereinafter referred to as "virtualization apparatus") 600 having the virtualization function of storage and a plurality of data storage apparatuses (hereinafter referred to as "external storage") 700 externally connected to the virtualization apparatus 600. In FIG. 1, only one virtualization apparatus 600 is expressed in order to make it clear that the virtualization apparatus 600 is not duplicated. As far as the virtualization apparatus 600 is not duplicated, a plurality of virtualization apparatuses 600 may be provided.

The plurality of work hosts 500, the virtualization apparatus 600 and the plurality of external storages 700 are connected to each other through a network (first network) 300 such as SAN or IP-SAN using FC (Fibre Channel) protocol or TCP/IP (Transmission Control Protocol/Internet Protocol) protocol. Further, the storage management server 100, the plurality of work hosts 500, the virtualization apparatus 600 and the plurality of external storages 700 are connected to each other through a network (second network) 310 such as LAN (Local Area Network) using TCP/IP protocol. When the first network 300 is the IP-SAN, the first and second networks may be the same network.

The work host 500 includes a host bus adapter (HBA) 980b which is an interface with the first network 300. The HBA 980b is connected to the first network 300. A path management program 510 stored in a main memory 890b of the work hosts 500 issues an input/output (I/O) request to a virtual volume or physical volume in the virtualization apparatus 600 and the external storage 700. The volume is described later in detail with reference to FIG. 19.

The virtualization apparatus 600 includes a channel adapter (CHA) 990c and a host bus adapter (HBA) 980c which are interfaces with the first network 300. The CHA 990c and the HBA 980c are connected to the first network 300. A virtualization disk controller 850c transmits an I/O request to a volume reached through the CHA 990c to a proper physical volume in a disk device 860c. Moreover, the virtualization disk controller 850c manages volumes in the virtualization apparatus 600 and physical volumes in the external storages 700 as virtual volumes and controls accesses from the work hosts 500. Further, the virtualization apparatus 600 manages a cache memory 620.

The external storage 700 includes a channel adapter (CHA) 990d which is an interface with the first network 300. The CHA 990d is connected to the first network 300. Further, a disk controller 850d transmits an I/O request to a volume reached through the CHA 990d to a proper physical volume in a disk device 860d.

Figure 19:
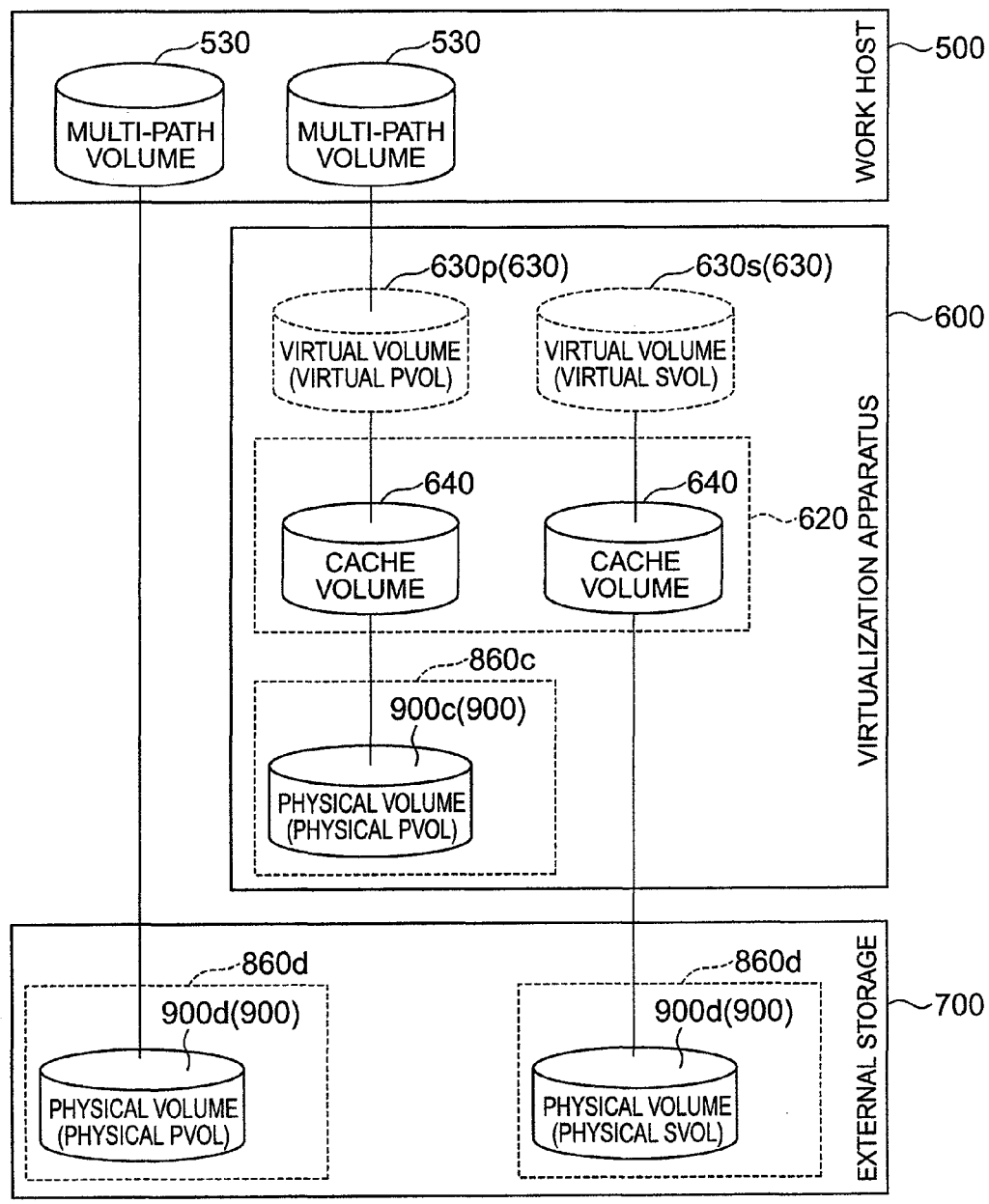
FIG. 19 is a schematic diagram illustrating an example of logical volume configuration in the storage management system.
Figure 27A:
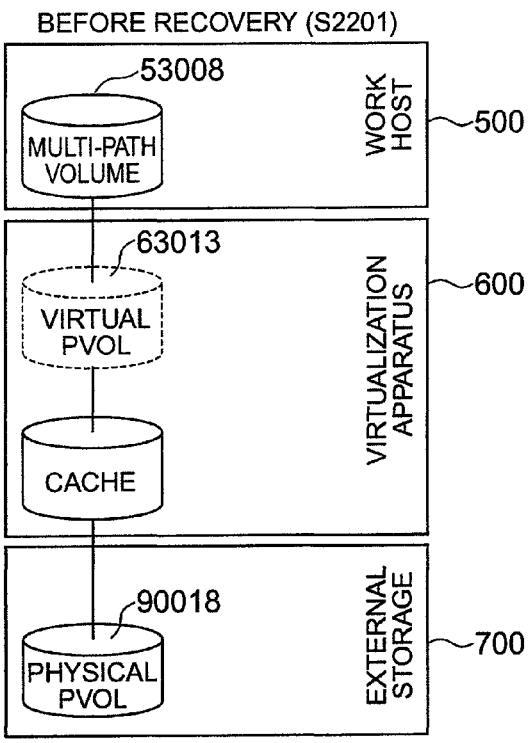
FIGS. 27A to 27D are schematic diagrams illustrating irrecoverable storage configuration in FIG. 15.
Figure 27B:
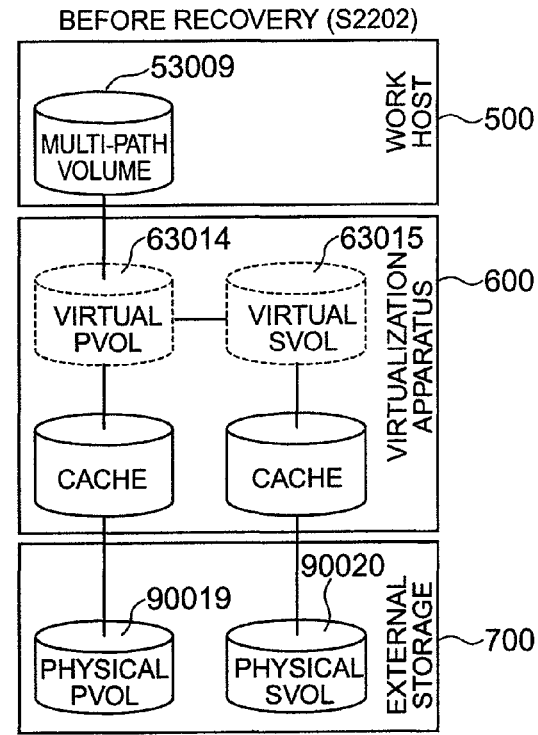
Figure 27C:
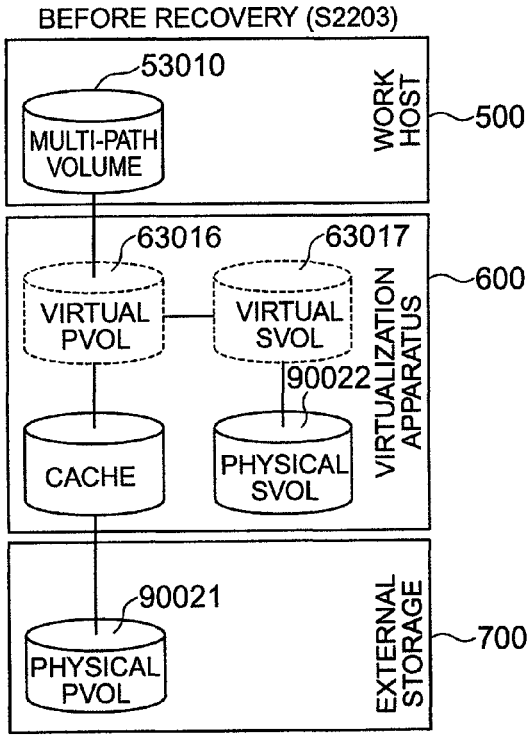
Figure 27D:
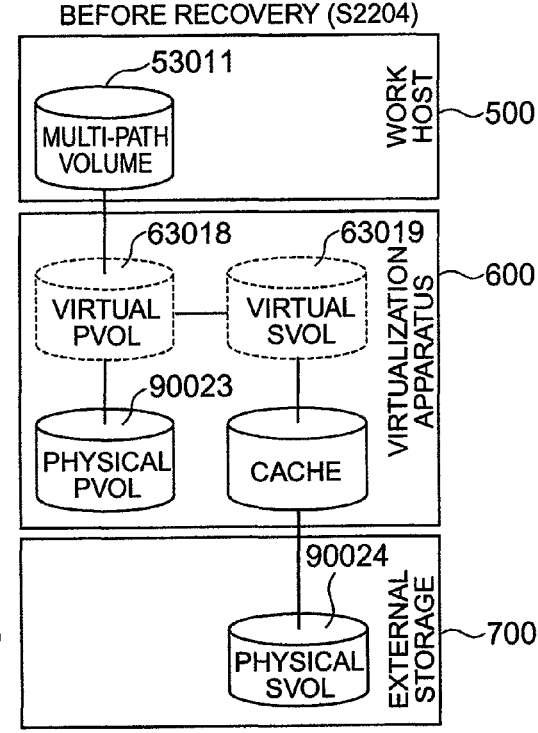

FIG. 19 is a diagram illustrating an example of logical volume configuration in the storage management system. The logical volume configuration is described referring properly to FIG. 1. For clarification of the drawing, parts of physical apparatuses and networks unnecessary for description are omitted and logical volumes and paths are mainly shown. The disk controllers 850d of the external storages 700 prepare physical volumes 900d (900) each of which is a logical access unit in the disk of the disk devices 860d. The virtualization disk controller 850c of the virtualization apparatus 600 prepares a physical volume 900c (900) which is a logical access unit in the disk of the disk device 860c.

Moreover, the virtualization disk controller 850c manages physical volumes 900 in the virtualization apparatus 600 and the external storages 700 as virtual volumes 630 and controls accesses from the work hosts 500. The virtualization disk controller 850c prepares cache volumes 640 each of which is a logical access unit in the cache memory 620. Zero or one cache volume 640 is assigned to each virtual volume 630.

When the cache volume 640 is assigned to the virtual volume 630 as shown in FIG. 19, the virtualization disk controller 850c once stores an I/O request to the virtual volume 630 in the high-speed cache volume 640 and reflects the I/O request to the physical volume 900 collectively at the timing that data stored in the cache volume is full, so that the I/O request processing can be attained at high speed. The virtualization disk controller 850c provides changing processing of validity and invalidity for cache as to whether the cache volume 640 is assigned to the virtual volume 630 or not.

Furthermore, the virtualization disk controller 850c prepares a pair of virtual volumes 630. The virtual volume constituting a primary volume (PVOL) of the virtual volumes 630 having the pair constructed is named a virtual primary volume (virtual PVOL) 630p and a physical volume constituting the entity of the virtual primary volume is named a physical primary volume (physical PVOL). Further, a virtual volume constituting a secondary volume (SVOL) of the virtual volumes 630 having the pair constructed is named a virtual secondary volume (virtual SVOL) 630s and a physical volume constituting the entity of the virtual secondary volume is named a physical secondary volume (physical SVOL).

The path management program 510 of the work host 500 provides a work application 520 (refer to FIG. 3) to a multi-path volume 530. The multi-path volume 530 is associated with a specific virtual volume 630 included in the virtualization apparatus 600 or a physical volume 900 included in the external storage 700 in a one-to-one correspondence manner by the path management program 510. A route extending from the multi-path volume 530 through the HBA 980b and the CHA 990c of the virtualization apparatus 600 or the CHA 990d of the external storage 700 to the virtual volume 630 or the physical volume 900 is named a path. The path is prepared by the virtualization disk controller 850c of the virtualization apparatus 600 or the disk controller 850d of the external storage 700. An I/O request issued from the work host 500 to the multi-path volume 530 is transmitted through the path to the virtualization apparatus 600 or the external storage 700.

Referring now to FIGS. 2 to 5, the configuration of each apparatus is described in detail.

Figure 2:
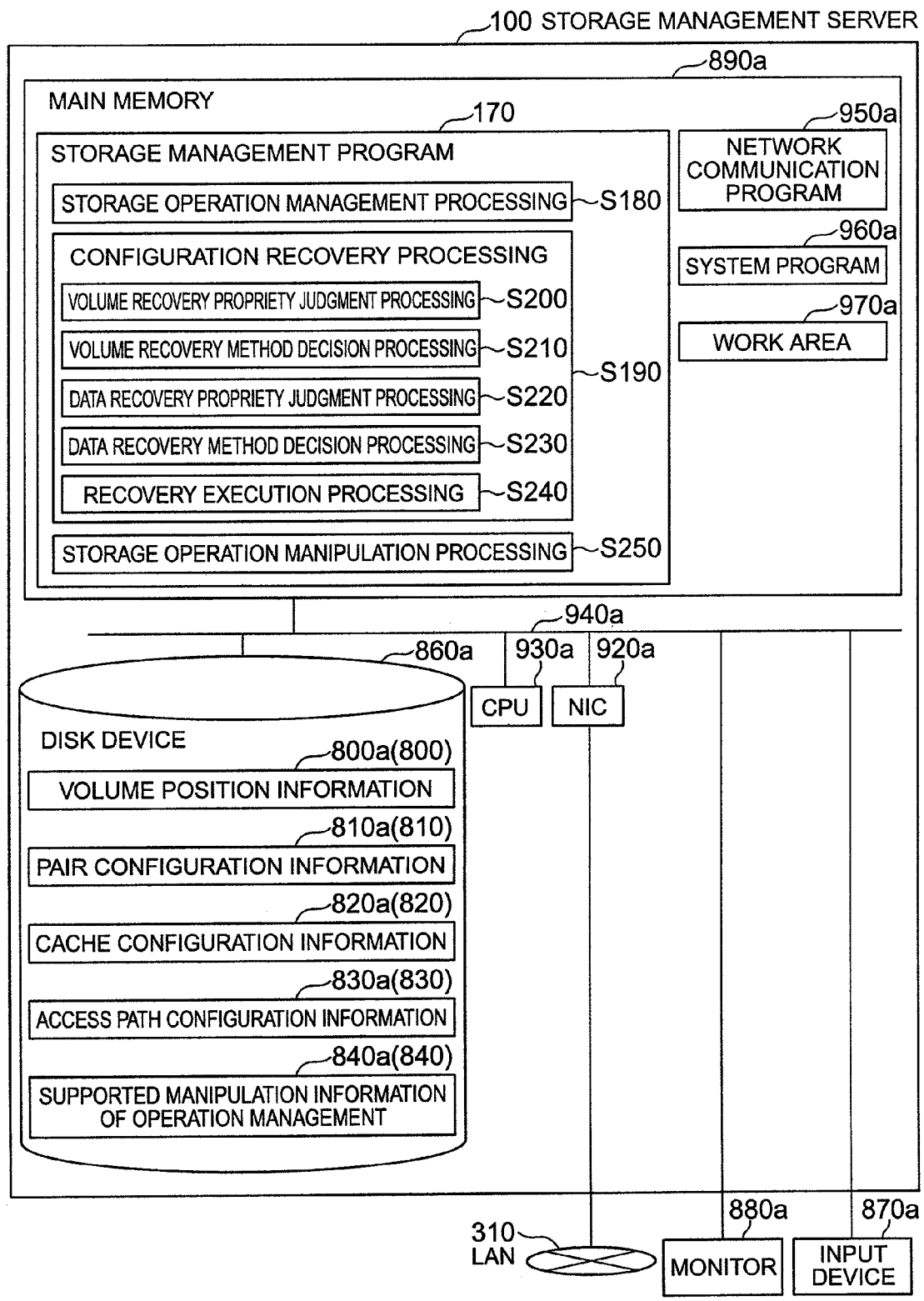
FIG. 2 is a schematic diagram illustrating an example of a storage management server used in the storage management system of FIG. 1.

FIG. 2 is a schematic diagram illustrating an example of the storage management server. The storage management server 100 includes a main memory 890a, a disk device 860a, a central processing unit (CPU) 930a, a network interface card (NIC) 920a, a video output device (monitor) 880a and an input device 870a, which are connected to a system bus 940a.

A storage management program 170, a network communication program 950a and a system program 960a are stored in the main memory 890a. A work area 970a used to store data necessary temporarily upon execution of a program is secured in the main memory 890a. The system program 960a provides the basic processing function for executing input/output of data between a peripheral apparatus and the storage management server and various programs including the storage management program 170.

The storage management program 170 includes storage operation management processing S180 and configuration recovery processing S190 described later and storage operation manipulation processing S250 which converts manipulation of operation management inputted to the virtualization apparatus 600 from the input device 870a by a manager into manipulation of operation management (manipulation of physical operation management) of the external storage 700 upon occurrence of failure in the virtualization apparatus 600.

The configuration recovery processing S190 performs collection of storage configuration information held in the virtualization apparatus 600 and the external storage 700, detection of failure in the virtualization apparatus 600 and configuration recovery processing for recovering configuration of the storage system upon occurrence of failure in the virtualization apparatus 600.

The configuration recovery processing S190 includes volume recovery propriety judgment processing S200 for judging whether each volume constituting each pair can be recovered or not, volume recovery method decision processing S210 for calculating or extracting a list of recovery method candidates applicable to each volume constituting each pair judged to be recoverable, data recovery propriety judgment processing S220 for judging whether data in the volume can be recovered or not when each volume recovery method is used, data recovery method decision processing S230 for calculating or extracting recovery method candidates applicable to the recoverable data and recovery execution processing S240. The list of recovery methods calculated or extracted in the processings S210 and S230 is displayed in the monitor 880a to make the manager select one recovery method by means of the input device 870a and then the recovery execution processing S240 executes the recovery processing of volume and data actually.

Volume position information 800a (800), pair configuration information 810a (810), cache configuration information 820a (820), access path configuration information 830a, supported manipulation information of operation management 840a (840) which are storage configuration information are stored in the disk device 860a. The storage configuration information is described later in detail (refer to FIGS. 6 to 10).

The CPU 930a executes various programs including the storage management program 170, the network communication program 950a and the system program 960a stored in the main memory 890a. The NIC 920a controls communication to the second network 310 required from the network communication program 950a. The monitor 880a is an apparatus for notifying the execution state of the program stored in the main memory 890a to the manager. The input device 870a is an apparatus for inputting manipulation of operation management to the program stored in the main memory 890a by the manager.

The storage management server 100 manages the state of each virtualization apparatus 600 and each external storage 700 by means of the storage management program 170 and executes the configuration recovery processing S190 upon occurrence of failure in the virtualization apparatus 600. Further, when the manager executes any operation to the storage management server 100, the storage management server 100 executes the storage operation manipulation processing S250.

The outline of operation in the storage management system is as follows.

The storage management server 100 executes the storage operation management processing S180. The storage operation management processing S180 is described later in detail (refer to FIG. 11), although the outline thereof is now described. The storage operation management processing S180 performs the following processing. The storage management server 100 collects storage configuration information through the second network (LAN) 310 from each virtualization apparatus 600 at predetermined intervals periodically or at the timing that configuration information of the virtualization apparatus 600 is changed, that is, when notification concerning change of the configuration information is received at the predetermined timing and stores it in the disk device 860a.

Next, the storage management server 100 performs confirmation of failure in each virtualization apparatus when notification concerning detection of failure is received at predetermined intervals periodically or at the timing that the virtualization apparatus 600 detects failure therein. The confirmation of failure is operation for judging that failure occurs when the storage management server 100 transmits a status return request to the virtualization apparatus 600 through the second network 310 plural times at predetermined intervals but any reply thereto is not returned or when a status return reply is returned but the status is diagnosed as failure, for example.

The storage operation management processing S180 executes the configuration recovery processing S190 to the virtualization apparatus 600 when it is judged that failure has occurred. The configuration recovery processing S190 is described later in detail (refer to FIG. 1), although the outline thereof is now described.

The configuration recovery processing S190 utilizes the storage configuration information held in the disk device 860a to calculate or extract a list of candidates for recovery methods of volume and data to each pair managed by the virtualization apparatus 600.

The recovery method of volume judges in which of the virtualization apparatus 600 or the external storage 700 the entities of the virtual primary volume and the virtual secondary volume constructing the pair are located on the basis of combination thereof while utilizing the pair configuration information 810a and the volume position information 800a. (1) For example, when the physical primary volume corresponding to the virtual primary volume is located in the virtualization apparatus and the physical secondary volume corresponding to the virtual secondary volume is located in the virtualization apparatus, the pair is judged to be irrecoverable (refer to FIG. 21). (2) When the physical primary volume corresponding to the virtual primary volume is located in the virtualization apparatus and the physical secondary volume corresponding to the virtual secondary volume is located in the external storage, the method of preparing the physical primary volume in the external storage and constructing a local pair is set as a recovery candidate by way of example (refer to FIG. 24). (3) When the physical primary volume corresponding to the virtual primary volume is located in the external storage and the physical secondary volume corresponding to the virtual secondary volume is located in the virtualization apparatus, the method of preparing the physical secondary volume in the external storage and constructing a local pair is set as a recovery candidate by way of example (refer to FIG. 23). (4) When the physical primary volume corresponding to the virtual primary volume is located in the external storage and the physical secondary volume corresponding to the virtual secondary volume is located in the external storage different from the virtual primary volume, the method of constructing a remote pair between both the external storages is set as a recovery candidate by way of example (refer to FIG. 26A). (5) When the physical primary volume corresponding to the virtual primary volume is located in the external storage and the physical secondary volume corresponding to the virtual secondary volume is located in the same external storage as the virtual primary volume, the method of constructing a local pair is set as a recovery candidate by way of example (refer to FIG. 25).

Figure 28A:
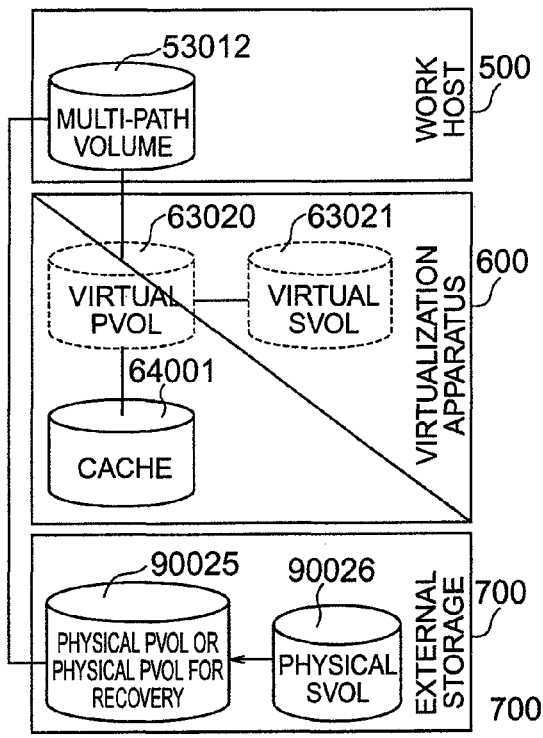
FIGS. 28A to 28D are schematic diagrams illustrating storage configuration and recovery method in FIG. 16.
Figure 28B:
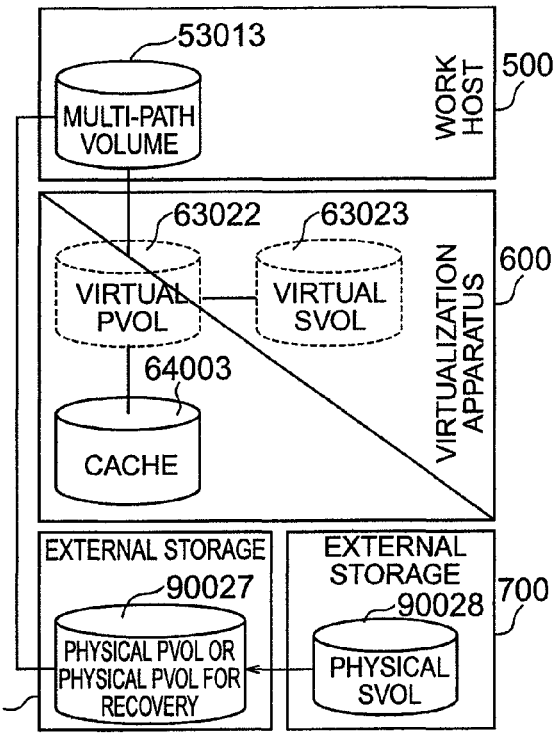
Figure 28C:
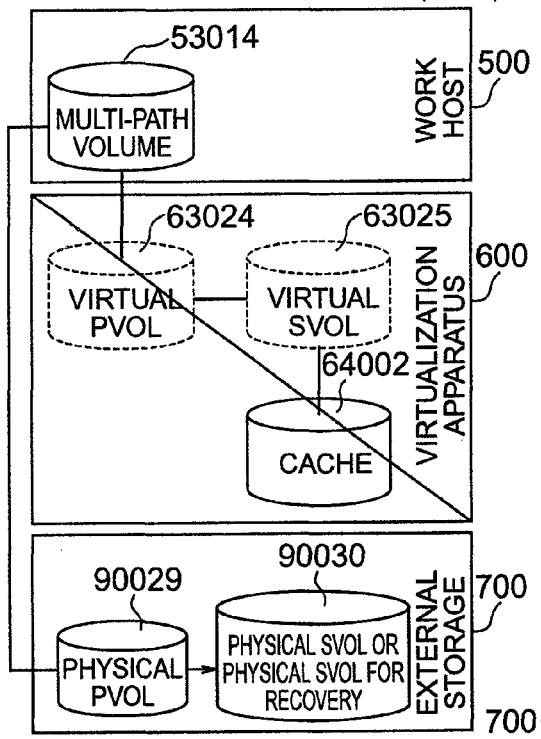
Figure 28D:
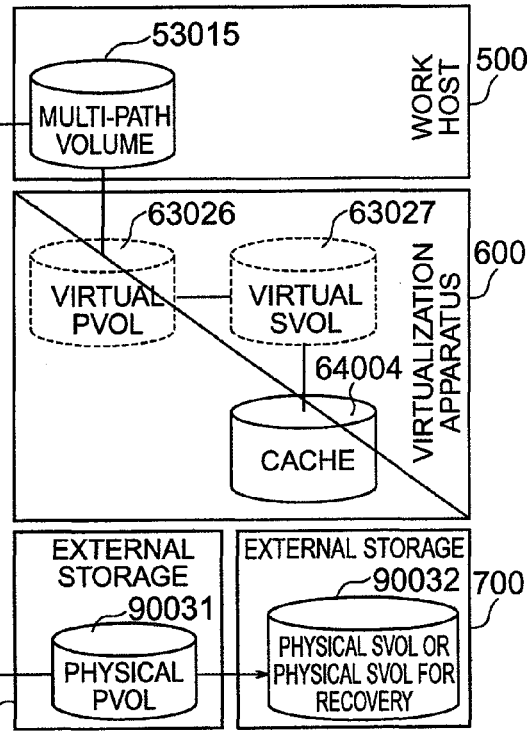

The recovery method of data is judged by combination of cache valid states of the virtual primary volume and the virtual secondary volume constructing the pair while utilizing the pair configuration information 810a and the cache configuration information 820a. The volume having the valid cache loses cache information when failure occurs in the virtualization apparatus, so that matching of data of the physical volume is lost. (1) For example, when the caches of the virtual primary volume and the virtual secondary volume are valid, the pair is judged to be irrecoverable (refer to FIGS. 27A to 27D). (2) When the cache of the virtual primary volume is valid and the cache of the virtual secondary volume is invalid, data of the physical primary volume is recovered from data of the physical secondary volume. At this time, when the physical primary volume and the physical secondary volume are located in the same external storage, recovery by local copy is set as data recovery candidate (refer to FIG. 28A). (3) On the other hand, when the physical primary volume and the physical secondary volume are located in different external storages, recovery by remote copy is set as data recovery candidate (refer to FIG. 28B). (4) When the cache of the virtual primary volume is invalid and the cache of the virtual secondary volume is valid, data of the virtual secondary volume is recovered from data of the virtual primary volume. At this time, when the physical primary volume and the physical secondary volume are located in the same external storage, recovery by local copy is set as data recovery candidate (refer to FIG. 28C). (5) On the other hand, when the physical primary volume and the physical secondary volume are located in different external storages, recovery by remote copy is set as data recovery candidate (refer to FIG. 28D).

Next, the configuration recovery processing S190 shows a list of candidates for the recovery methods to the manager to make the manager select any one of the recovery methods. After the recovery method is decided, the configuration recovery processing S190 transmits a system reconstruction request for preparation of physical volume, preparation of pair, access path and the like to the external storage 700.

Further, the storage management server 100 executes the storage operation manipulation processing S250. The storage operation manipulation processing S250 is described later in detail (refer to FIG. 18), although the outline thereof is now described.

When failure does not occur in the virtualization apparatus 600, the storage management server 100 transmits the manipulation instruction of storage operation management inputted by the manager to the virtualization apparatus 600. On the other hand, when failure occurs in the virtualization apparatus 600, the storage operation manipulation processing S250 performs the following processing.

First, the storage operation manipulation processing S250 judges in which external storage 700 the virtual volume that is the volume of an object of manipulation of the storage operation management inputted by the manager is located and to which physical volume in the external storage the virtual volume corresponds while utilizing the storage configuration information stored in the disk device 860a.

Next, the storage operation manipulation processing S250 converts the manipulation instruction of the storage operation management from the instruction for the virtualization apparatus 600 into the instruction for the external storage 700. Thereafter, the storage operation manipulation processing S250 converts an identifier of the virtual volume to be manipulated into an identifier for a physical volume in the external storage 700 and transmits the manipulation instruction of storage operation management to the external storage 700 through the LAN.

Figure 3:
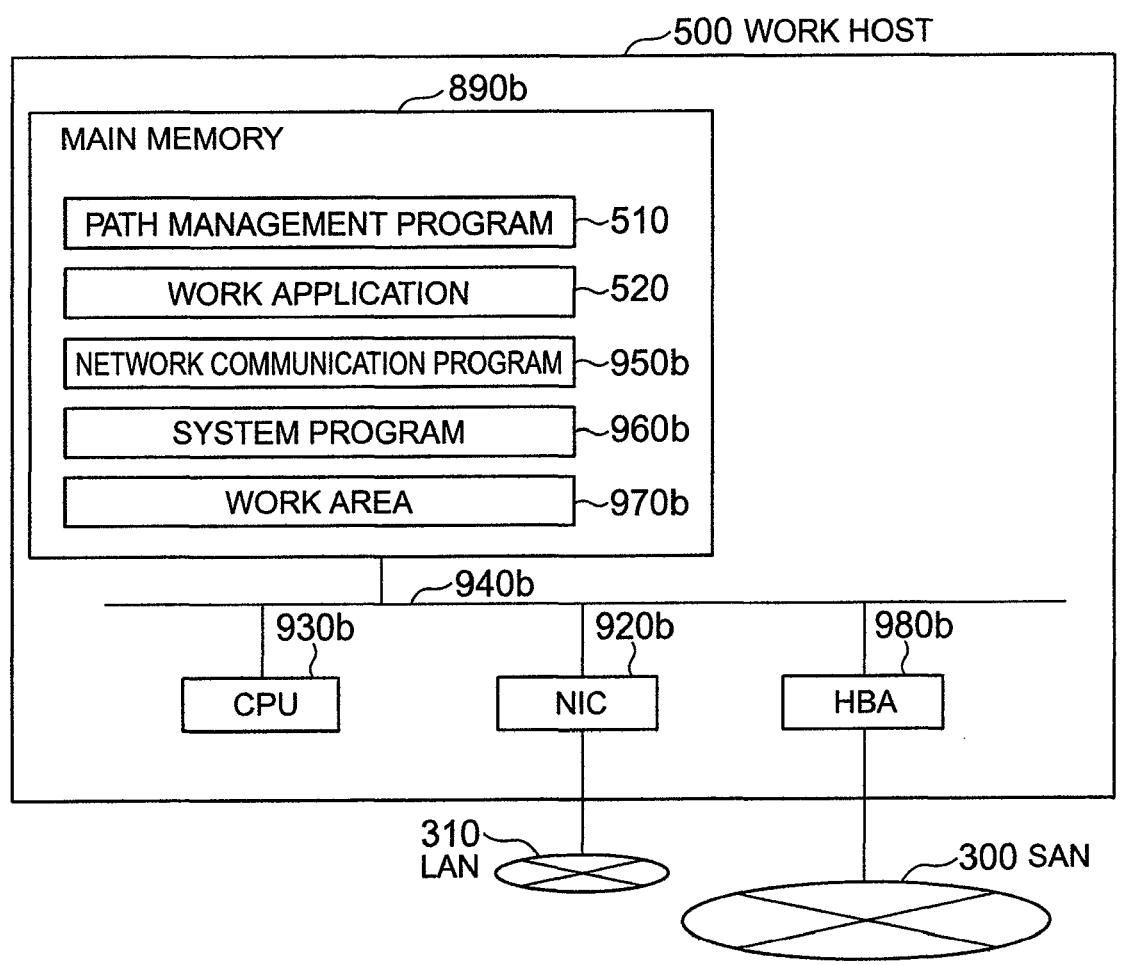
FIG. 3 is a schematic diagram illustrating an example of a work host used in the storage management system of FIG. 1.

FIG. 3 is a schematic diagram illustrating an example of the work host. The work host 500 includes a main memory 890b, a CPU 930b, an NIC 920b and an HBA 980b, which are connected to a system bus 940b. A path management program 510, a work application 520, a network communication program 950b and a system program 960b are stored in the main memory 890b. Further, a work area 970a which is a memory area for storing data necessary temporarily upon execution of a program is secured in the main memory 890b. The work application 520 is a program operated by the manager in order to execute work in the present system. The path management program 510 performs collection of information concerning the path of the work host 500 and the virtual volume 630 in the virtualization apparatus 600 or the physical volume 900 in the external apparatus 700 and load dispersion for selecting the path in accordance with a load of I/O.

The CPU 930b executes various programs containing the path management program 510, the work application 520, the network communication program 950b and the system program 960b stored in the main memory 890b. The NIC 920b controls communication to the second network 310 required from the network communication program 950b. The HBA 980b is an apparatus for connecting to the first network 300.

Figure 4:
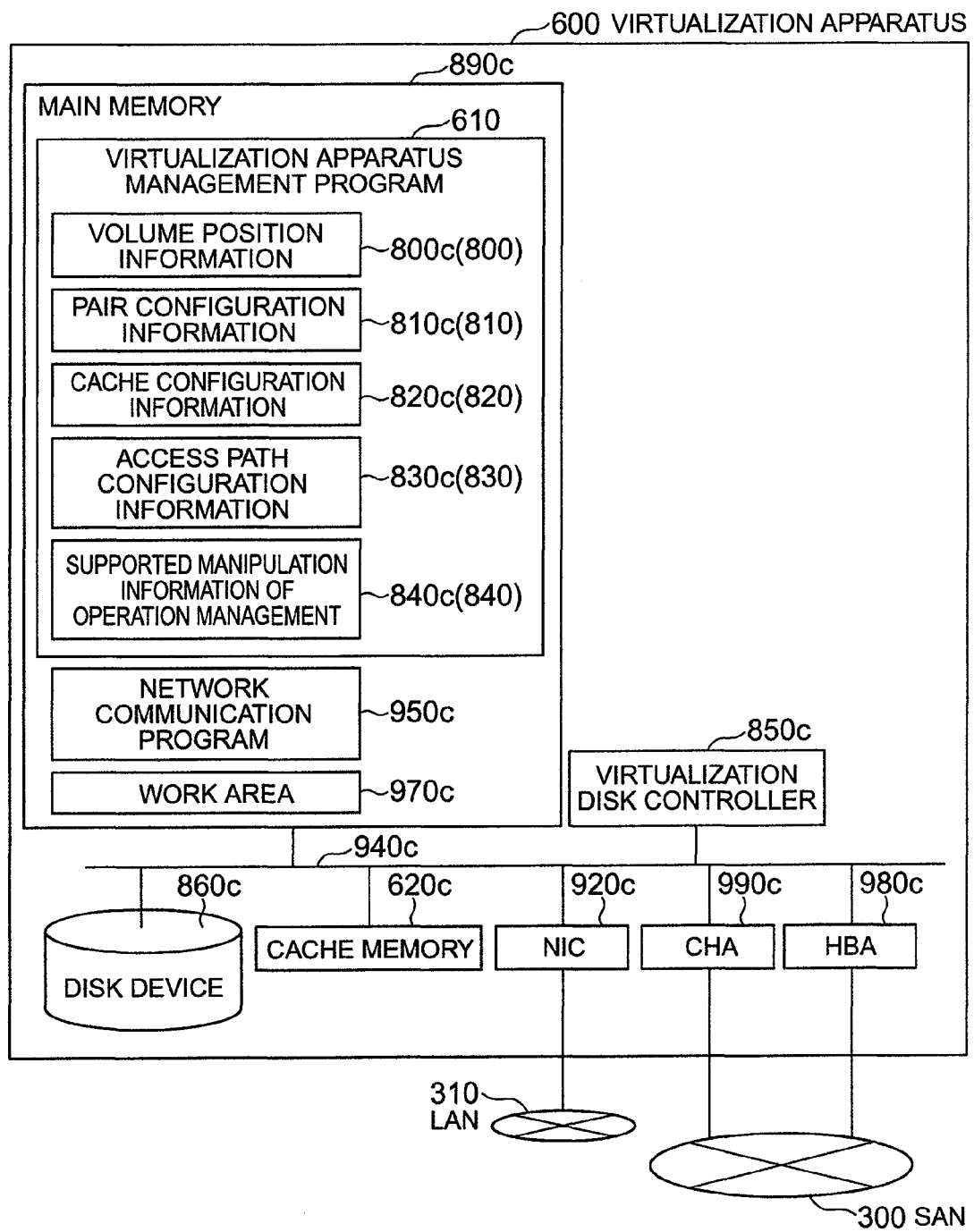
FIG. 4 is a schematic diagram illustrating an example of a virtualization apparatus used in the storage management system of FIG. 1.

FIG. 4 is a schematic diagram illustrating an example of the virtualization apparatus. The virtualization apparatus 600 includes a main memory 890c, a virtualization disk controller 850c, a disk device 860c, a cache memory 620c, an NIC 920c, a CHA 990c and an HBA 980c, which are connected to a system bus 940c. A virtualization apparatus management program 610 and a network communication program 950c are stored in the main memory 890c. A work area 970c which is an memory area for storing data necessary temporarily upon execution of a program is secured in the main memory 890c.

The virtualization apparatus management program 610 holds volume position information 800c (800), pair configuration information 810c (810), cache configuration information 820c (820), access path configuration information 830c (830) and supported manipulation information of operation management 840c (840) which are storage configuration information. The storage configuration information is described later in detail.

The virtualization apparatus management program 610 performs processing for preparing the disk device 860c as physical volume which is logical access unit, processing for managing physical volumes in the external storage 700 and the virtualization apparatus 600 as virtual volumes, processing for preparing a pair between virtual volumes, processing for changing setting of validity and invalidity of cache for each virtual volume, processing for preparing logical path between the work host 500 and the virtualization apparatus 600 and processing for judging whether failure occurs in the virtualization apparatus or not.

The virtualization disk controller 850c controls execution of various programs stored in the main memory 890c. Moreover, the virtualization disk controller 850c controls the RAID (Redundant Arrays of Inexpensive Disks) group composed of some disk devices 860c. Further, the virtualization disk controller 850c divides the memory area of the plurality of disk devices 860c constituting the RAID group into predetermined areas to form physical volumes which are logical access unit. The virtualization disk controller 850c transmits an I/O request to virtual volume received through the CHA 990c to physical volume constructed in the disk device 860c or physical volume in the external storage 700. At this time, when physical volume corresponding to virtual volume is located in the external storage 700, the virtualization disk controller issues I/O request to HBA 980c and transmits it to the external storage 700 through first network 300.

The cache memory 620c provides area for storing I/O temporary data when I/O request is transmitted to virtual volume. The NIC 920c controls communication to the second network 310 required from the network communication program 950c. The CHA 990c and the HBA 980c are connected to the first network 300.

Figure 5:
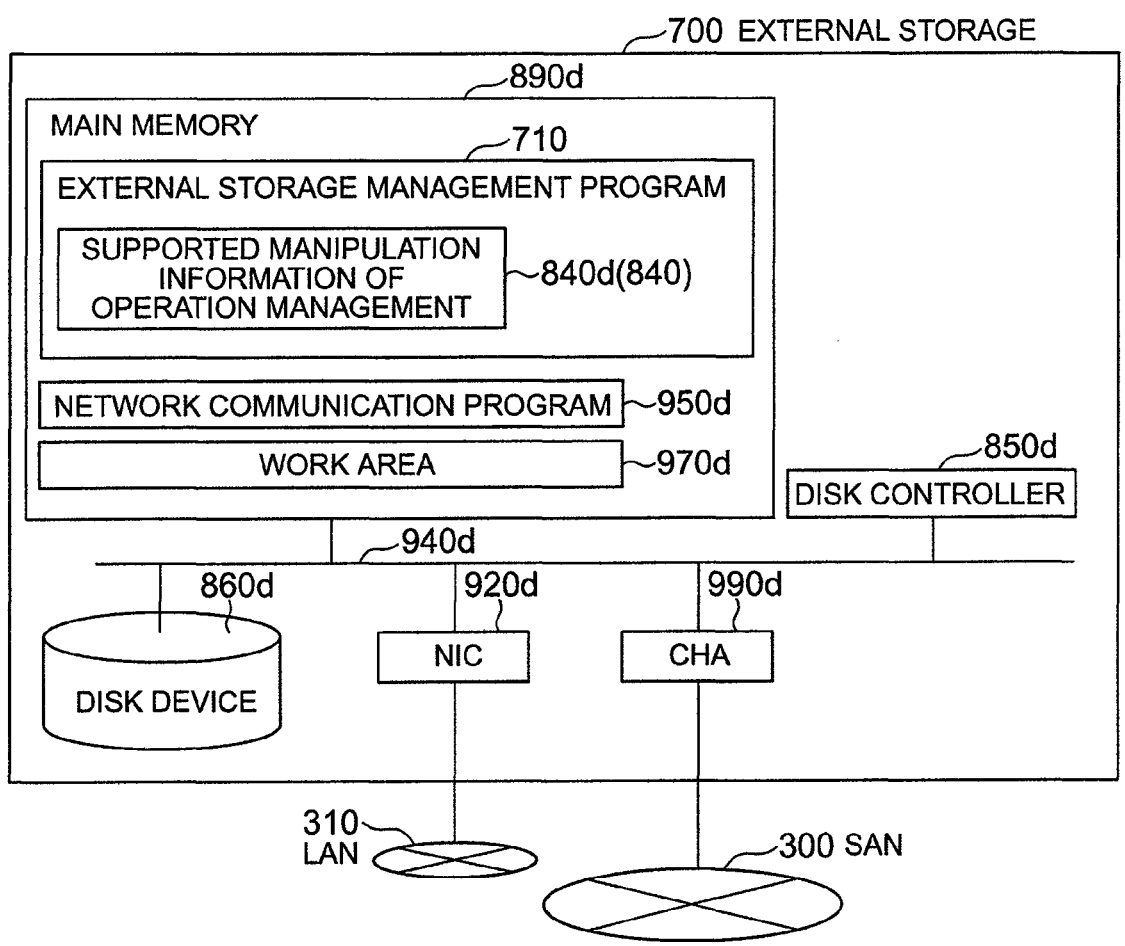
FIG. 5 is a schematic diagram illustrating an example of an external storage used in the storage management system of FIG. 1.

FIG. 5 is a schematic diagram illustrating an example of the external storage. The external storage 700 includes a main memory 890d, a disk controller 850d, a disk device 860d, an NIC 920d and a CHA 990d, which are connected to a system bus 940d. An external storage management program 710 and a network communication program 950d are stored in the main memory 890d. A work area 970d which is a memory area for storing data necessary temporarily upon execution of a program is secured in the main memory 890d.

The external storage management program 710 holds supported manipulation information of operation management 840d (840) which is storage configuration information. The storage configuration information is described later in detail with reference to FIG. 10. The external storage management program 710 performs processing for preparing the disk device 860d as physical volume which is logical access unit, processing for preparing a pair between physical volumes and processing for preparing logical path between the work host 500 and the external storage 700.

The disk controller 850d controls execution of various programs stored in the main memory 890d. Moreover, the disk controller 850d controls the RAID group composed of some disk devices 860. Further, the disk controller 850d divides the memory area of the plurality of disk devices 860d constituting the RAID group into predetermined areas to form physical volumes which are logical access unit. The disk controller 850d transmits an I/O request to physical volume received through CHA 990d to physical volume constructed in the disk device 860d. The NIC 920d controls communication to the second network 310 required from the network communication program 950d. The CHA 990d is connected to the first network 300.

FIG. 6 shows an example of a table of volume position information. The volume position information 800 (800a and 800c) is correspondence information of virtual volume and physical volume managed in each virtualization apparatus 600 and is information prepared by the virtualization apparatus management program 610 of the virtualization apparatus 600 and intensively collected by the storage management server 100 to make backup.

The volume position information 800 includes a virtualization apparatus identifier 80001 uniquely indicating the virtualization apparatus 600, a virtual volume identifier 80002 uniquely indicating the virtual volume managed by the virtualization apparatus identifier 80001, a physical apparatus identifier 80003 uniquely indicating the data storage apparatus in which physical volume corresponding to virtual volume is stored and a physical volume identifier 80004 uniquely identifying the physical volume in the data storage apparatus corresponding to virtual volume.

The virtualization apparatus identifier 80001 and the physical apparatus identifier 80003 are derived from serial numbers (e.g. MAC (Media Access Control) address of NIC 920) assigned to the apparatuses upon shipping by a virtualization apparatus and external storage manufacturing vendor so that the serial numbers are unique in the whole world. The virtual volume identifier 80002 is derived from serial numbers assigned to virtual volumes 630 each time the virtualization apparatus 600 prepares the virtual volume 630. This identifier is unique in the virtualization apparatus 600. The physical volume identifier 80004 is derived from serial numbers assigned to physical volumes 900 each time the virtualization apparatus 600 or the external storage 700 prepares the physical volume 900. This identifier is unique in the apparatus.

The volume position information 800 held in the storage management server 100 is rewritten into volume configuration that does not utilize the virtualization apparatus 600 by execution of the configuration recovery processing S190. More specifically, all values of the physical apparatus identifiers 8003 and the physical volume identifiers 8004 are identifiers for the external storage 700. Values of the physical apparatus identifiers 80003 and the physical volume identifier 80004 for the volumes having no recovery method are vacant (in FIG. 6, it is expressed by "–" for convenience). Entries 80050, 80051, 80052, 80053, 80054, 80055, 80056, 80057 and 80058 for the volume position information 800 of FIG. 6 are rewritten into 80060, 80061, 80062, 80063, 80064, 80065, 80066, 80067 and 80068, respectively.

More particularly, since the virtual volume of the entry 80050 does not have the recovery method, the physical apparatus identifier and the physical volume identifier of entry 80060 are both vacant. The virtualization apparatus "USP1" which is a value of the physical apparatus identifier and the physical volume "R-VOL2" in the virtualization apparatus which is a value of the physical volume identifier as indicated by entry 80051 are changed to the external storage "DF1" which is a value of the physical apparatus identifier and the physical volume "R-VOL2" in the external storage which is a value of the physical volume identifier as indicated by entry 80061 in post-recovery differently from in ante-recover. Further, the external storage "DF1" which is a value of the physical apparatus identifier and the physical volume "R-VOL3" in the virtualization apparatus which is a value of the physical volume identifier as indicated by entry 80056 are changed to the external storage "DF2" which is a value of the physical apparatus identifier and the physical volume "R-VOL4" in the external storage which is a value of the physical volume identifier as indicated by entry 80066 in post-recovery differently from in ante-recovery.

FIGS. 7A and 7B show an example of tables of pair configuration information. The pair configuration information 810 (810a and 810c) is identifier information of a pair of virtual primary volume and virtual secondary volume prepared by each virtualization apparatus 600 and is information prepared by the virtualization apparatus management program 610 (refer to FIG. 4) of the virtualization apparatus 600 and intensively collected by the storage management server 100 to make backup.

The pair configuration information 810c (refer to FIG. 4) includes a virtualization apparatus identifier 81001 which is an identifier uniquely indicating the virtualization apparatus 600, a virtual primary volume identifier 81002 which is an identifier uniquely indicating a virtual volume constituting a primary volume of the pair and a virtual secondary volume identifier 81003 which is an identifier uniquely indicating a virtual volume constituting a secondary volume of the pair. In case of a volume having no pair constructed, an identifier of the volume is represented as a virtual primary volume identifier 81002 and a virtual secondary volume identifier 81003 is vacant (in FIG. 7, it is expressed by "–" for convenience).

The pair configuration information 810a (refer to FIG. 2) is information intensively collected by the storage management server 100 to make backup and accordingly the pair configuration information 810a includes recovery candidate 81004 in addition to the virtualization apparatus identifier 81001, the virtual primary volume identifier 81002 and the virtual secondary volume identifier 81003. A plurality of recovery candidates are enumerated to be registered and the form of the registration is (volume recovery method and data recovery method).

In case of a volume having no pair constructed, an identifier of the volume is represented as a virtual primary volume identifier 81002 and a virtual secondary volume identifier 81003 is vacant (in FIG. 7, it is expressed by "–" in convenience).

The virtualization apparatus identifier 81001 is derived from the serial numbers (e.g. MAC address of NIC 920) assigned to the apparatuses upon shipping by the virtualization apparatus manufacturing vendor so that the serial numbers are unique in the whole world. The virtual primary volume identifier 81002 and the virtual secondary volume identifier 81003 are derived from serial numbers assigned to virtual volumes each time the virtualization apparatus 600 prepares the virtual volume 630. This identifier is unique in the virtualization apparatus 600.

FIG. 8 shows an example of a table of cache configuration information. The cache configuration information 820 (820a and 820c) is information for managing whether each virtual volume managed by each virtualization apparatus 600 is operated as cache being valid or invalid and is information prepared by the virtualization apparatus management program 610 of the virtualization apparatus 600 and intensively collected by the storage management server 100 to make backup. The cache configuration information 820 includes a virtualization apparatus identifier 82001 uniquely indicating the virtualization apparatus 600, a virtual volume identifier 82002 uniquely indicating virtual volume managed by the virtualization apparatus 600 and cache utilization 82003 indicating a flag representing whether cache is valid or invalid by yes or no.

The virtualization apparatus identifier 82001 is derived from serial numbers (e.g. MAC address of NIC920) assigned to the apparatuses upon shipping by the virtualization apparatus manufacturing vendor so that the serial numbers are unique in the whole world. The virtual volume identifier 82002 is derived from serial numbers assigned to virtual volumes each time the virtualization apparatus 600 prepares the virtual volume 630. This identifier is unique in the virtualization apparatus 600. The cache utilization 82003 is set to yes when cache of volume of the virtual volume identifier 82002 is valid and set to no when it is invalid.

FIG. 9 shows an example of a table of access path configuration information. The access path configuration information 830 (830a and 830c) is information of a path constructed between each virtualization apparatus 600 and each work host 500 and is information prepared by the virtualization apparatus management program 610 of the virtualization apparatus 600 and intensively collected by the storage management server 100 to make backup. The access path configuration information 830 includes a virtualization apparatus identifier 83001 uniquely indicating the virtualization apparatus 600, a virtual volume identifier 83002 uniquely indicating a virtual volume managed by the virtualization apparatus 600 and a work host identifier 83003 uniquely indicating a work host utilizing the virtual volume.

The virtualization apparatus identifier 83001 is derived from serial numbers (e.g. MAC address of NIC 920) assigned to the apparatuses upon shipping by the virtualization apparatus manufacturing vendor so that the serial numbers are unique in the whole world. The virtual volume identifier 83002 is derived from serial numbers assigned to virtual volume each time the virtualization apparatus 600 prepares the virtual volume 630. This identifier is unique in the virtualization apparatus 600. The work host identifier 83003 is derived from serial numbers (e.g. MAC address of NIC 920) assigned to the apparatuses upon shipping by the work host manufacturing vendor so that the serial numbers are unique in the whole world.

FIG. 10 shows an example of a table of supported manipulation information of operation management. The supported manipulation information of operation management 840 (840a, 840c, 840d) is manipulation information of operation management provided by the virtualization apparatus 600 and the external storage 700 which are the data storage apparatus and is information prepared by the management program of each data storage apparatus and intensively collected by the storage management server 100 to make backup. The supported manipulation information of operation management 840 includes a physical apparatus identifier 84001 uniquely indicating the data storage apparatus, a provision manipulation name 84002 which is an identifier indicating manipulation of operation management provided by the data storage apparatus and a virtual provision manipulation name 84003 which is a virtual manipulation name corresponding to a provision manipulation name.

The physical apparatus identifier 84001 is derived from serial numbers (e.g. MAC address of NIC 920) assigned to the apparatuses upon shipping by the vendor manufacturing the virtualization apparatus and the external storage so that the serial numbers are unique in the whole world. The provision manipulation name 84002 shows a manipulation name corresponding to the virtual provision manipulation name 84003. The vendor manufacturing the virtualization apparatus and the external storage registers a list of provision manipulation names upon shipping. When manipulation corresponding to the virtual provision manipulation name 84003 is not provided, the provision manipulation name is vacant (in FIG. 10, it is expressed by "–"). The virtual provision manipulation name 84003 shows a virtualized provision manipulation name. For example, the storage provision manipulation name standardized by SNIA (Storage Networking Industry Association) is utilized therefor.

Figure 11:
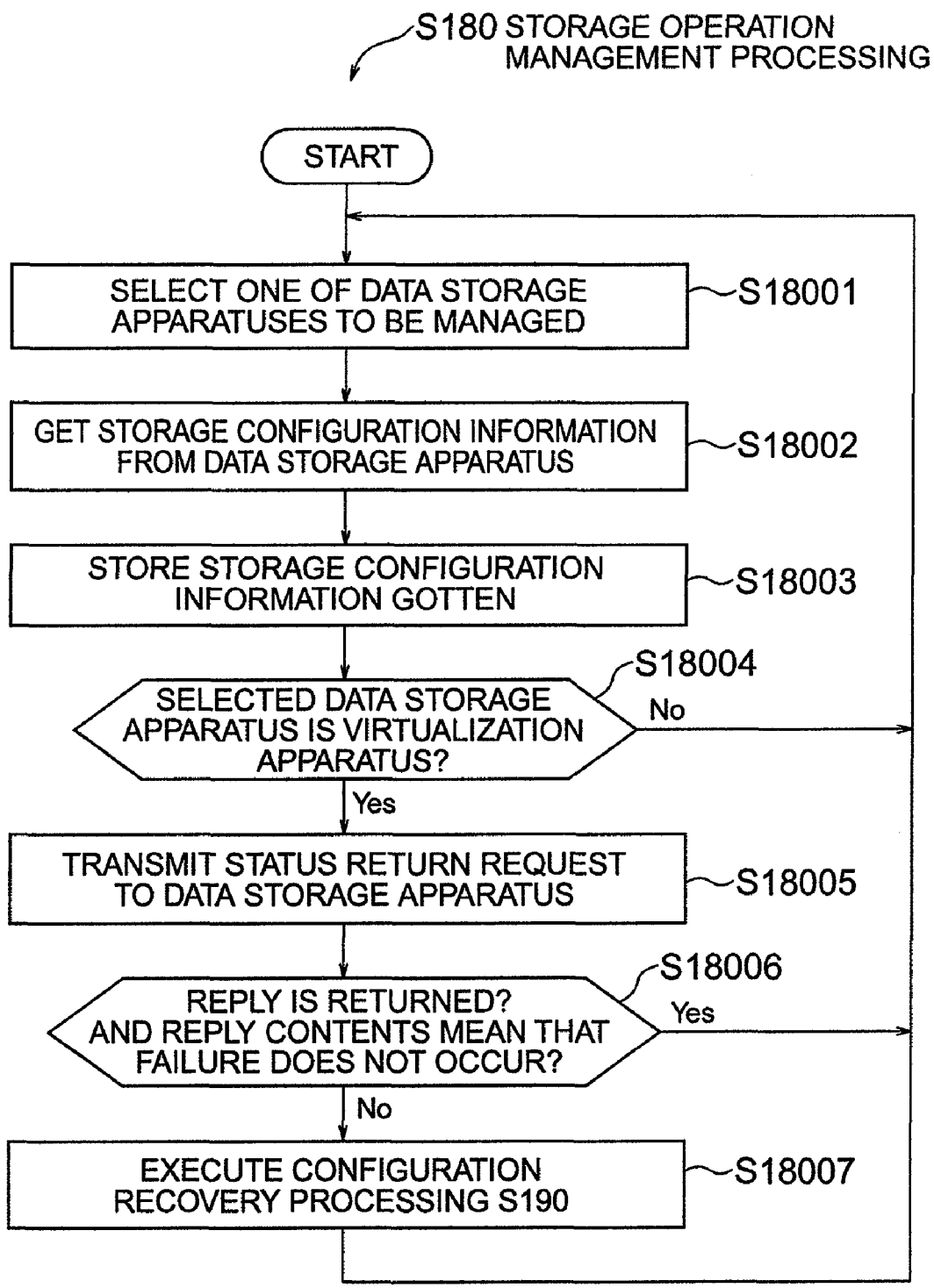
FIG. 11 is a flowchart showing storage operation management processing in the storage management server.

FIG. 11 is a flowchart showing the storage operation management processing in the storage management server. The storage operation management processing S180 is part of processing of the storage management program 170 executed as a demon when the storage management server 100 is started. When the storage operation management processing S180 is executed once, the execution is not stopped as far as the storage management server 100 is not ended. The storage operation management processing S180 provides main processing of the present invention and mainly executes monitoring processing of the virtualization apparatus 600 and processing of recovering the system configuration in which operation is performed without passing through the virtualization apparatus 600 upon detection of failure. The storage operation management processing S180 is executed by the CPU 930*a* (refer to FIG. 2).

First, the storage operation management processing S180 selects any one of the virtualization apparatuses 600 or the external storages 700 constituting the data storage apparatuses to be managed by the storage management server 100 (step S18001) and stores information for the selected data storage apparatus in the work area 970*a*. Next, the storage operation management processing S180 transmits a return request for getting the storage configuration information to the selected data storage apparatus through the second network 310. When the selected data storage apparatus is the virtualization apparatus 600, the virtualization apparatus management program 610 returns the volume position information 800*c*, the pair configuration information 810*c*, the cache configuration information 820*c*, the access path configuration information 830 and the supported manipulation information of operation management 840*c*. On the other hand, when the selected data storage apparatus is the external storage 700, the external storage management program 710 returns the supported manipulation information of operation management 840*d*. The storage operation management processing S180 gets the storage configuration information (step S18002).

Next, the storage management server 100 receives the storage configuration information through the LAN and stores it in the disk device 860*a* (step S18003). More particularly, the storage management server 100 stores the virtual volume provided by the virtualization apparatus, the volume position information 800 indicating the mapping relation between the physical storages and the physical volumes, the pair configuration information 810 indicating configuration of the pair prepared in the virtualization apparatus, the cache configuration information 820 indicating the utilization situation of cache for each virtual volume and the access path configuration information 830 indicating configuration of access path between the work host and the virtualization apparatus.

The storage operation management process S180 judges from information in the work area 970*a* whether the selected data storage apparatus is the virtualization apparatus 600 or not (step S18004). When it is not the virtualization apparatus 600 (No of step S18004), that is, when it is the external storage 700, the processing is returned to step S18001. When it is the virtualization apparatus 600 (Yes of step S18004), the processing proceeds to step S18005. Next, the storage operation management processing S180 transmits the status return request to the virtualization apparatus 600 which is the selected data storage apparatus through the second network 310 (step S18005).

The virtualization apparatus management program 610 of the virtualization apparatus 600 examines whether failure occurs in the virtualization apparatus 600 or not and returns its result to the storage management server 100. At this time, when the virtualization apparatus 600 is in the state in which the virtualization apparatus cannot execute the virtualization apparatus management program 610, for example, when failure such as failure in the virtualization disk controller 850, failure in a power supply, failure in the main memory 890*c* or the like occurs, the virtualization apparatus cannot return any reply to the storage management server 100. When any replay is not returned from the virtualization apparatus 600, the storage operation management processing S180 transmits the status return request again after a predetermined waiting time (e.g. 10 minutes) passes plural times (for example, 5 times) until the reply can be obtained.

Next, the storage operation management processing S180 examines information returned from the virtualization apparatus and judges whether the reply to the status return request is returned or not and whether the contents of the reply mean that any failure does not occur or not (step S18006). When the reply information means that failure does not occur (Yes of step S18006), the processing is returned to step S18001. On the other hand, when any reply is not returned or when the reply information means that failure occurs (No of step S18006), the processing proceeds to step S18007.

Finally, in order to recover the storage management system into the storage configuration which does not utilize the virtualization apparatus in which failure occurs, the configuration recovery processing S190 is executed (step S18007). The configuration recovery processing S190 is described in detail with reference to FIG. 12.

Figure 12:
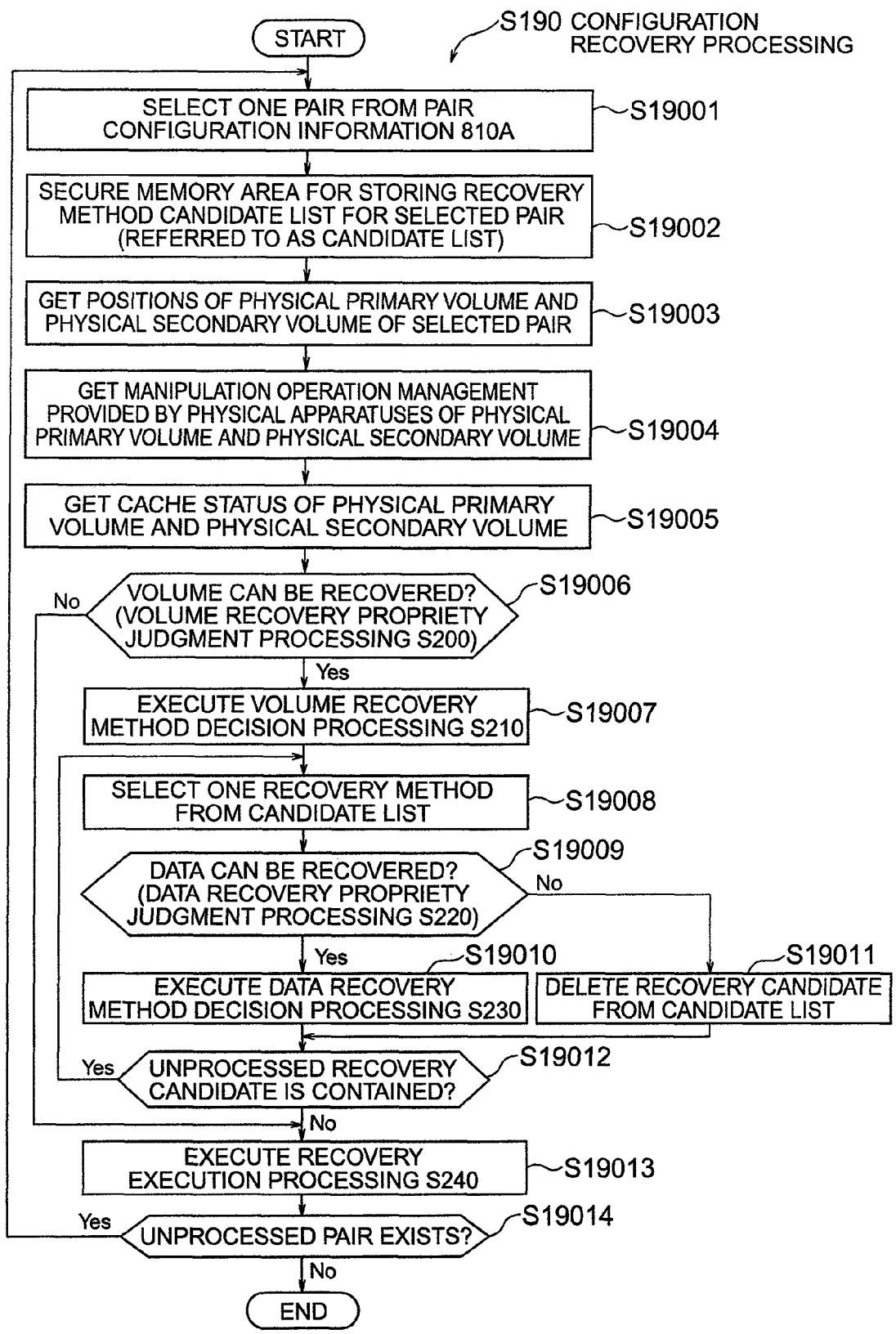
FIG. 12 is a flowchart showing configuration recovery processing.

FIG. 12 is a flowchart showing the configuration recovery processing. The configuration recovery processing S190 is called up when it is judged that failure occurs in the virtualization apparatus 600 which is any data storage apparatus selected by the storage operation management processing S180. The configuration recovery processing S190 is executed by the CPU 930*a* (refer to FIG. 2) so as to scan all pairs managed by the virtualization apparatus 600 successively and calculate or extract a list of candidates of the recovery methods for each pair.

First, the configuration recovery processing S190 extracts pair information relating to the virtualization apparatus from the pair configuration information 810*a* to select one therefrom (step S19001) and stores the selected pair information in the work area 970*a*. Next, a memory area for storing a list of recovery methods for the pair selected in step S19001 is secured in the work area 970*a* (hereinafter, the list of recovery methods for the selected pair stored in the memory area is referred to as a list of candidates) (step S19002).

Next, the virtual primary volume identifier 81002 and the virtual secondary volume identifier 81003 corresponding to the pair selected in step S19001 are gotten from the pair configuration information 810*a*. Then, the physical apparatus identifier 80003 and the physical volume identifier 80004 which are position information of the physical volume corresponding to the virtual volume of the virtual primary volume identifier 81002 and the virtual secondary volume identifier 81003 constructing the pair selected in step S19001 are gotten from the volume position information 800*a* (step S19003) and stored in the work area 970*a*. When the pair selected in step S19001 has only volume having no pair constructed, the position information of the physical secondary volume is vacant.

Next, manipulation information (manipulation information of operation management) provided by the physical apparatus identified by the physical apparatus identifier 80003 of the physical primary volume (physical PVOL) and the physical secondary volume (physical SVOL) stored in the work area 970*a* is gotten from the supported manipulation information of operation management 840*a* (step S19004) and stored in the work area 970*a*. Then, the pair information selected in step S19001 is gotten from the pair configuration information 810*a* and whether the cache of each volume of the virtual primary volume identifier 81002 and the virtual secondary volume identifier 81003 constituting the pair selected in step S19001 is validated to be operated or not is gotten from the cache configuration information 820*a* (step S19005) and stored in the work area 970*a*.

Next, the volume recovery propriety judgment processing S200 for judging whether the lost pair and volume can be reconstructed or not is executed to judge whether the volume can be recovered or not (step S19006). The volume recovery propriety judgment processing S200 is described later in detail with reference to FIG. 13. When it is judged that the volume cannot be recovered in the volume recovery propriety judgment processing S200 (No of step 19006), the pair selected in step S19001 is judged to be irrecoverable and the processing proceeds to step S19013. When it is judged that the pair selected in step S19001 can be recovered (Yes of step S19006), the processing proceeds to next step S19007.

When it is judged that the volume can be recovered in step S19006, the volume recovery method decision processing S210 for calculating or extracting a list of candidates of the reconstruction methods of pair and volume is executed (step S19007). The volume recovery method decision processing S210 is described later in detail with reference to FIG. 14. The list information of volume candidates calculated or extracted in the volume recovery method decision processing S210 is added to the candidate list secured in the work area 970a.

Next, the candidates in the list calculated in step S19007 are scanned successively to calculate or extract the data recovery methods for the respective volume recovery methods. First, one volume recovery candidate is selected from the candidate list (step S19008) and the pair information selected in step S19001 is stored in the work area 970a.

Then, the data recovery propriety judgment processing S220 for judging whether data in the volume can be recovered or not is executed to judge whether the data can be recovered or not (step S19009). The data recovery propriety judgment processing S220 is described later in detail with reference to FIG. 15. When it is judged that the data cannot be recovered in the data recovery propriety judgment processing S220 (No of step S19009), the volume recovery method candidate selected in step S19008 is deleted from the candidate list (step S19011) since the data cannot be recovered even if the pair and the volume are recovered. On the other hand, when it is judged that the data can be recovered in the data recovery propriety judgment processing S220 (Yes of step S19009), the data recovery method decision processing S230 is executed in order to calculate or extract the actual data recovery method (step S19010). The data recovery method decision processing S230 is described later in detail with reference to FIG. 16.

Next, it is judged whether the volume recovery candidate having the data recovery method being unprocessed is contained in the candidate list for the pair selected in step S19001 or not (step S19012). When the unprocessed volume recovery candidate is contained (Yes of step S19012), the processing is returned to step S19008 and the data recovery method is calculated or extracted repeatedly. When the unprocessed volume recovery candidate is not contained (No of step S19012), the recovery execution processing S240 for actually making the manager select any one recovery candidate from the candidate list for the pair selected in step S19001 is executed (step S19013). The recovery execution processing S240 is described later in detail with reference to FIG. 17.

Finally, it is judged whether any unprocessed pair exists in the pairs managed in the virtualization apparatus or not (step S19014). When the unprocessed pair exists (Yes of step S19014), the processing is returned to step S19001 and the same processing is repeated. When there is no unprocessed pair (No of step S19014), the series of processing is ended.

Figure 13:
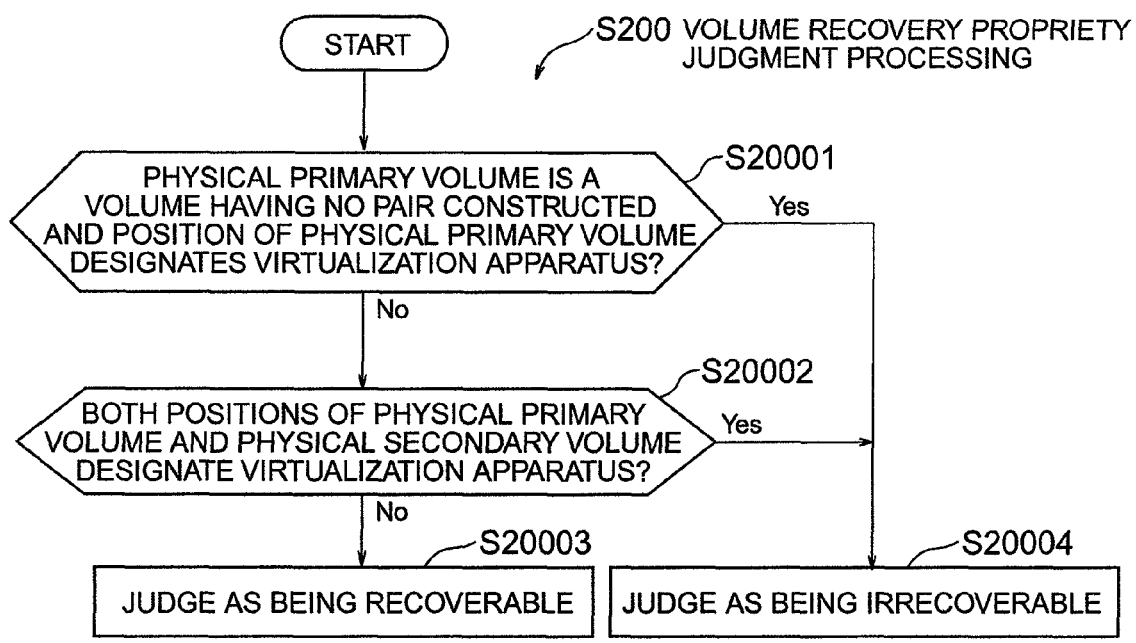
FIG. 13 is a flowchart showing volume recovery propriety judgment processing.

FIG. 13 is a flowchart showing the volume recovery propriety judgment processing. FIGS. 20 and 21 illustrate an example of irrecoverable storage configuration in FIG. 13.

The volume recovery propriety judgment processing S200 is executed by the CPU 930a (refer to FIG. 2) so as to judging whether the pair selected in step S19001 and stored in the work area 970a and the volume constructing the pair can be recovered or not.

First, the volume recovery propriety judgment processing S200 refers to the physical primary volume 90001 (refer to FIG. 20) and the physical secondary volume stored in the work area 970a to judge that the pair selected in step S19001 is irrecoverable when the physical secondary volume is vacant, that is, when the physical secondary volume is a volume having no pair constructed and the physical apparatus identifier 80003 of the physical primary volume 90001 designates the virtualization apparatus 600 (Yes of step S20001) and processing is ended (step S20004). When the physical secondary volume is a volume having no pair constructed and the physical apparatus identifier 80003 of the physical primary volume 90001 does not designate the virtualization apparatus 600 (No of step S20001), the processing proceeds to step S20002. In FIG. 20, configuration before recovery (Yes of step S20001) and judgment state of irrecoverableness (shown by slant line in FIG. 20) are shown.

Next, when the physical apparatus identifiers 80003 of the physical primary volume 90002 (refer to FIG. 21) and the physical secondary volume 90003 (refer to FIG. 21) both designate the virtualization apparatus 600 (Yes of step S20002), it is judged that the pair selected in step S19001 is irrecoverable and the processing is ended (step S20004). In FIG. 21, configuration before recovery (Yes of step S20002) and judgment state of irrecoverableness are shown.

Finally, when the judgment in both of steps S20001 and S20002 is negative (No of step S20002), that is, when any one or both of the physical apparatus identifiers 80003 of the physical primary volume and the physical secondary volume designate the external storage 700, it is judged that the pair selected in step S19001 is recoverable and the processing is ended (step S20003).

Figure 14B:
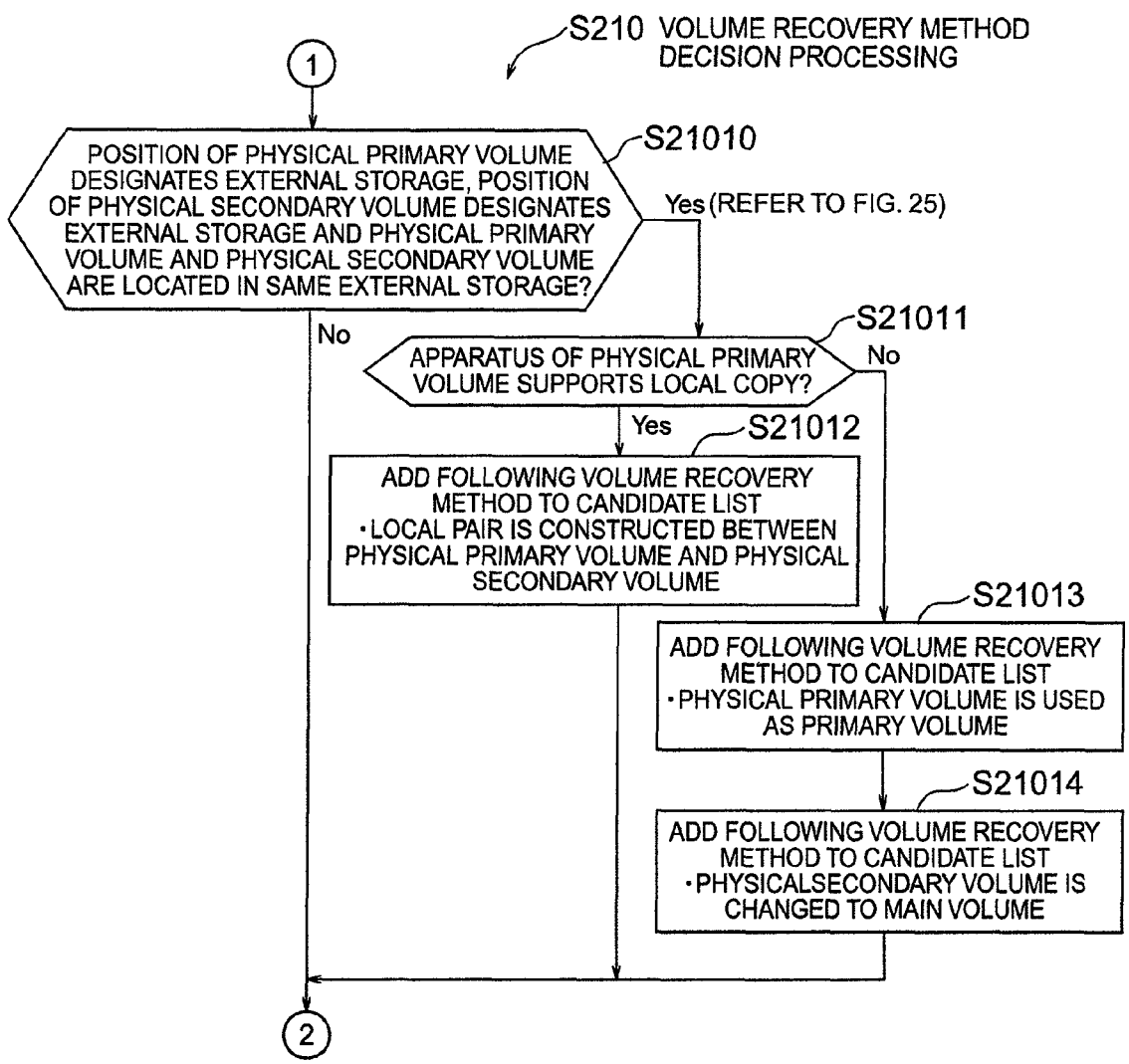

FIGS. 14A, 14B and 14C are flowcharts showing the volume recovery decision processing. FIGS. 22, 23 and 24 illustrate storage configurations and its recovery candidates in FIG. 14A. FIG. 25 illustrates storage configurations and its recovery candidates in FIG. 14B. FIGS. 26A, 26B and 26C illustrate storage configurations and its recovery candidates in FIG. 14C. The volume recovery method decision processing S210 is executed by the CPU 930a (refer to FIG. 2) so as to calculate or extract a list of candidates of recovery methods of the pairs selected in step S19001 and stored in the work area 970a and the volumes constructing the pairs.

First, the volume recovery method decision processing S210 refers to the position information of the physical primary volume 90004 (refer to FIG. 22) and the physical secondary volume stored in the work area 970a to judge whether the physical apparatus identifier 80003 of the physical primary volume 90004 designates the external storage 700 and the physical secondary volume is vacant or not, that is, the physical secondary volume is not the volume having no pair constructed or not (step S21001). When the judgment is affirmative (Yes of step S21001), the processing proceeds to step S21003A and when the judgment is negative (No of step S21001), the processing proceeds to step S21002.

In step S21003A, it is judged whether the apparatus of the physical primary volume can provide local copy and the secondary volume for recovery can be prepared or not. More particularly, the work area 970a and the manipulation information of operation management provided by the external storage of the physical primary volume are referred to examine whether the external storage provides the local copy or not. If the external storage provides the local copy, inquiry as to whether the volume having the same capacity as the physical primary volume can be prepared or not is made to the external storage through the second network (LAN) 310. When a reply to the effect that the volume can be prepared is received from the external storage (Yes of step S21003A), the processing proceeds to step S21004A. On the other hand, when the judgment of step S21003A is negative (No of step S21003A), processing in step S21005A is executed.

In step S21004A, physical secondary volume 90005 (hereinafter physical secondary volume prepared as volume recovery is referred to as physical secondary volume for recovery) having the same capacity as the physical primary volume 90004 (refer to FIG. 22) or 90006 is prepared in the external storage. The local pair is constructed between the physical primary volume 90004 and the physical secondary volume 90005 for recovery and the work host 500 decides as the volume recovery method that the work host accesses to the physical primary volume 90004. This recovery method is added in the candidate list and the processing proceeds to step S21002.

In step S21005A, the work host decides as the recovery method of volume that the physical primary volume 90004 is utilized as it is and adds the recovery method to the candidate list. Then, the processing proceeds to step S21002. In FIG. 22, configuration before recovery (Yes of step S21001) and configurations of recovery candidates corresponding to steps S21004A and S21005A are shown.

In step S21002, it is judged whether the physical apparatus identifier 80003 of the physical primary volume 90006 (refer to FIG. 23) designates the external storage and the physical apparatus identifier 80003 of the physical secondary volume 90007 (refer to FIG. 23) designates the virtualization apparatus or not. When the judgment is affirmative (Yes of step S21002), the processing proceeds to step S21003B and when the judgment is negative (No of step S21002), the processing proceeds to step S21006.

In step S21003B, it is judged whether the apparatus of the physical primary volume can provide the local copy and the physical secondary volume for recovery can be prepared or not. More particularly, the work area 970a and the manipulation information of operation management provided by the external storage of the physical primary volume are referred to examine whether the external storage provides the local copy or not. If the external storage provides the local copy, inquiry as to whether the volume having the same capacity as the physical primary volume can be prepared or not is made to the external storage through the second network (LAN) 310. When a reply to the effect that the volume can be prepared is received from the external storage (Yes of step S21003B), the processing proceeds to step S21004B. On the other hand, when the judgment of step S21003B is negative (No of step S21003B), processing in step S21005B is executed.

In step S21004B, the physical secondary volume 90008 (physical volume for recovery) having the same capacity as the physical primary volume 90006 (refer to FIG. 23) is prepared in the external storage. The local pair is constructed between the physical primary volume 90004 and the physical secondary volume for recovery 90008 and the work host decides as the volume recovery method that the work host accesses to the physical primary volume 90006. This recovery method is added to the candidate list and the processing proceeds to step S21006.

In step S21005B, the work host decides as the recovery method of volume that the physical primary volume 90006 is utilized as it is without recovering the physical secondary volume 90007 (refer to FIG. 23) and constructing the pair and adds this recovery method to the candidate list. Then, the processing proceeds to step S21006. In FIG. 23, configuration before recovery (Yes of step S21002) and configurations of recovery candidates corresponding to steps S21004B and S21005B are shown.

In step S21006, it is judged whether the physical apparatus identifier 80003 of the physical primary volume 90009 (refer to FIG. 24) designates the virtualization apparatus and the physical apparatus identifier 80003 of the physical secondary volume 90010 (refer to FIG. 24) designates the external storage or not. When the judgment is affirmative (Yes of step S21006), the processing proceeds to step S21007 and when the judgment is negative (No of step S21006), the processing proceeds to step S21010 (refer to FIG. 14B).

In step S21007, it is judged whether the apparatus of the physical secondary volume can provide the local copy and the physical primary volume for recovery can be prepared or not. More particularly, the work area 970a and the manipulation information of operation management provided by the external storage of the physical secondary volume are referred to examine whether the external storage provides the local copy or not. If the external storage provides the local copy, inquiry as to whether the volume having the same capacity as the physical secondary volume can be prepared or not is made to the external storage through the LAN. When a reply to the effect that the volume can be prepared is received from the external storage (Yes of step S21007), the processing proceeds to step S21008. On the other hand, when the judgment of step S21007 is negative (No of step S21007), processing in step S21009 is executed.

In step S21008, the physical primary volume 90011 (the volume prepared for recovery of the physical primary volume is hereinafter referred to the physical volume for recovery) having the same capacity as the physical primary volume 90009 (refer to FIG. 24) is prepared in the external storage. The local pair is constructed between the physical primary volume for recovery 90011 and the physical secondary volume 90010 and the work host decides as the volume recovery method that the work host accesses to the physical primary volume for recovery 90011. This recovery method is added to the candidate list and the processing proceeds to step S21010.

In step S21009, the physical secondary volume 90010 is changed to the physical primary volume for recovery 90010A without recovering the physical primary volume 90009 and constructing the pair and the work host decides as the recovery method of volume that the physical primary volume for recovery 90010A is utilized as it is and adds this recovery method to the candidate list. Then, the processing proceeds to step S21010.

In step S21010 (refer to FIG. 14B), it is judged whether the physical apparatus identifier 80003 of the physical primary volume 90012 (refer to FIG. 25) designates the external storage, the physical apparatus identifier 80003 of the physical secondary volume 90013 (refer to FIG. 25) designates the external storage and the physical primary volume 90012 and the physical secondary volume 90013 are located in the same external storage or not. When the judgment is affirmative (Yes of step S21010), the processing proceeds to step S21011 and when the judgment is negative (No of step S21010), the processing proceeds to step S21015.

In step S21011, it is judged whether the apparatus of the physical primary volume supports the local copy or not. More particularly, the manipulation information of operation management provided by the external storage of the physical primary volume is referred to examine whether the external storage supports the local copy or not. When the judgment is affirmative (Yes of step S21011), the processing proceeds to step S21012 and when the judgment is negative (No of step S21011), the processing proceeds to step S21013.

In step S21012, the local copy is constructed between the physical primary volume 90012 and the physical secondary volume 90013 and the work host decides as the volume recovery method that the work host accesses to the physical primary volume 90012. This recovery method is added to the candidate list and the processing proceeds to step S21015.

In step S21013, the physical secondary volume 90013 is not recovered and the pair is not constructed. The work host decides as the volume recovery method that the work host utilizes the physical primary volume 90012 as it is without recovering the physical secondary volume 90013 and constructing the pair and adds this recovery method to the candidate list. Then, the processing proceeds to step S21014.

In step S21014, the physical secondary volume 90013 is changed to the physical primary volume for recovery 90013A without recovering the physical primary volume 90012 and constructing the pair and the work host decides as the recovery method of volume that the physical primary volume for recovery 90013A is utilized. This recovery method is added to the candidate list. Then, the processing proceeds to step S21015. In FIG. 25, configuration before recovery (Yes of step S21010) and configurations of recovery candidates corresponding to steps S21012, S21013 and S21014 are shown.

In step S21015 (refer to FIG. 14C), it is judged whether the physical apparatus identifier 80003 of the physical primary volume 90014 (refer to FIG. 26A) designates the external storage, the physical apparatus identifier 80003 of the physical secondary volume 90015 designates the external storage and the physical primary volume 90014 and the physical secondary volume 90015 are located in different external storages or not. When the judgment is affirmative (Yes of step S21015), the processing proceeds to step S21016 and when the judgment is negative (No of step S21015), the volume recovery method decision processing S210 is ended.

In step S21016, it is judged whether both the apparatuses of the physical primary volume and the physical secondary volume support the remote copy or not. More particularly, the manipulation information of operation management provided by the external storage of the physical primary volume and the manipulation information of operation management provided by the external storage of the physical secondary volume are referred to judge whether these information supports the remote copy or not. When the judgment is affirmative (Yes of step S21016), the processing proceeds to step S21017 and when the judgment is negative (No of step S21016), the processing proceeds to step S21018.

In step S21017, the remote copy is constructed between the physical primary volume 90014 and the physical secondary volume 90015 and the work host decides as the volume recovery method that the work host accesses to the physical primary volume 90014. This recovery method is added to the candidate list. Then, the processing proceeds to step S21018. In FIG. 26A, configuration before recovery (Yes of step S21015) and configuration of recovery candidate corresponding to step S21017 are shown.

In step S21018, it is judged whether the apparatus of the physical primary volume can provide the local copy and the volume can be prepared or not. More particularly, the work area 970a and the manipulation information of operation management provided by the external storage of the physical primary volume are referred to examine whether the external storage provides the local copy or not. When the external storage provides the local copy, inquiry as to whether the volume having the same capacity as the physical primary volume can be prepared or not is made to the external storage through the LAN. When a reply to the effect that the volume can be prepared is received from the external storage (Yes of step S21018), the processing proceeds to step S21019. On the other hand, when the judgment is negative (No of step S21018), the processing proceeds to step S21020.

In step S21019, the physical secondary volume for recovery 90016 (refer to FIG. 26C) having the same capacity as the physical primary volume 90014 is prepared in the external storage and the local pair is constructed between the physical primary volume 90014 and the physical secondary volume for recovery 90016. The work host decides as the volume recovery method that the work host accesses to the physical primary volume 90014 and adds this recovery method to the candidate list. Then, the processing proceeds to step S21021.

In step S21020, the work host decides as the volume recovery method that the physical primary volume 90014 (refer to FIG. 26B) is utilized as it is without recovering the physical secondary volume 90015 and constructing the pair and adds this recovery method to the candidate list. Then, the processing proceeds to step S21021.

In step S21021, it is judged whether the apparatus of the physical secondary volume can provide the local copy and the volume can be prepared or not. More particularly, the work area 970a and the manipulation information of operation management provided by the external storage of the physical secondary volume are referred to examine whether the external storage provides the local copy or not. When the external storage provides the local copy, inquiry as to whether the volume having the same capacity as the physical secondary volume can be prepared or not is made to the external storage through the LAN. When a reply to the effect that the volume can be prepared is received from the external storage (Yes of step S21021), the processing proceeds to step S21022. On the other hand, when the judgment is negative (No of step S21021), the processing proceeds to step S21023.

In step S21022, the physical primary volume for recovery 90017 (refer to FIG. 26C) having the same capacity as the physical secondary volume 90015 is prepared in the external storage and the local pair is constructed between the physical primary volume for recovery 90017 and the physical secondary volume 90015. The work host decides as the volume recovery method that the work host accesses to the physical primary volume for recovery 90017 and adds this recovery method to the candidate list. Then, the processing is ended.

In step S21023, the physical secondary volume 90015 is changed to the physical primary volume for recovery 90015A (refer to FIG. 26B) without recovering the physical primary volume 90014 and constructing the pair and the work host decides as the volume recovery method that the physical primary volume for recovery 90015A is utilized. This recovery method is added to the candidate list. Then, the processing is ended.

In FIG. 26B, configuration before recovery (Yes of step S21015) and configurations of recovery candidates corresponding to steps S21020 and S21023 are shown. Further, in FIG. 26C, configuration before recovery (Yes of step S21015) and configurations of recovery candidates corresponding to steps S21019 and S21022 are shown.

FIG. 15 is a flowchart showing the data recovery propriety judgment processing. FIGS. 27A to 27D illustrate irrecoverable storage configuration in FIG. 15. The data recovery propriety judgment processing S220 is executed for the volume recovery candidates calculated or extracted in the volume recovery method decision processing S210 and is executed by the CPU 930a so as to judge whether data can be recovered or not when the volume recovery method is applied.

First, the data recovery propriety judgment processing S220 refers to the virtual primary volume 63013 (refer to FIG. 27A), the cache information of the virtual secondary volume and position information of the physical primary volume 90018 (refer to FIG. 27A) and the physical secondary volume and judges whether the position information of the physical secondary volume is vacant or not, that is, whether the physical secondary volume is a volume having no pair constructed and the cache of the virtual primary volume 63013 is valid or not (step S22001). When the judgment is affirmative (Yes of step S22001), it is judged that data of the pair selected in step S19001 is irrecoverable (step S22006). When the judgment is negative (No of step S22001), the processing proceeds to step S22002.

In step S22002, when both the caches of the virtual primary volume 63014 (refer to FIG. 27B) and the virtual secondary volume 63015 (refer to FIG. 27B) are valid (Yes of step S22002), it is judged that data of the pair selected in step S19001 is irrecoverable (step S22006). When the judgment is negative (No of step S22002), the processing proceeds to step S22003.

In step S22003, when the physical apparatus identifier 80003 of the physical secondary volume 90022 (refer to FIG. 27C) is located in the virtualization apparatus and the cache of the virtual primary volume 63016 (refer to FIG. 27C) is valid (Yes of step S22003), it is judged that data of the pair selected in step S19001 is irrecoverable (step S22006). When the judgment is negative (No of step S22003), the processing proceeds to step S22004.

In step S22004, when the physical apparatus identifier 80003 of the physical primary volume 90023 (refer to FIG. 27D) is located in the virtualization apparatus and the cache of the virtual secondary volume 63019 (refer to FIG. 27D) is valid (Yes of step S22004), it is judged that data of the pair selected in step S19001 is irrecoverable (step S22006). When the judgment is negative (No of step S22004), the processing proceeds to step S22005.

Finally, in step S22005 (judgment in all steps S22001, S22002, S22003 and S22004 is negative), it is judged that data of the pair selected in step S19001 is recoverable and the processing is ended.

FIG. 16 is a flowchart showing the data recovery method decision processing. FIGS. 28A to 28D illustrate storage configuration and the recovery method in FIG. 16. The data recovery method decision processing S230 is executed by the CPU 930a so as to calculate or extract the data recovery method for the volume recovery candidates judged that data can be recovered in the data recovery propriety judgment processing S220.

First, the data recovery method decision processing S230 judges whether a pair is not present or not (step S23001). When the pair is not present, that is, when the volume recovery method in which the pair is not reconstructed and the volume is recovered by only single volume is judged (No of step S23001), it is not necessary to recover data and the processing is ended. When the pair is present (Yes of step S23001), the processing proceeds to step S23002.

In step S23002, it is judged whether the cache of the virtual secondary volume is invalid or not. When the judgment is negative (when the cache is valid) (No of step S23002), the processing proceeds to step S23003 and when the judgment is affirmative (when the cache is invalid) (Yes of step S23002), the processing proceeds to step S23006.

In step S23003, it is judged whether both the physical apparatus identifiers 80003 of the physical primary volume and the physical secondary volume designate the same external storage or not. When the judgment is affirmative (Yes of step S23003), the processing proceeds to step S23004 and when it is negative (No of step S23003), the processing proceeds to step S23005.

In step S23004 (refer to FIG. 28C), the data recovery method decision processing S230 decides as the data recovery method that the physical secondary volume or physical secondary volume for recovery 90030 is recovered from the physical primary volume 90029 by the local copy and this data recovery method of the volume is added to the candidate list. The processing is ended.

In step S23005 (refer to FIG. 28D), the data recovery method decision processing S230 decides as the data recovery method that the physical secondary volume or physical secondary volume for recovery 90032 is recovered from the physical primary volume 90031 by the remote copy and this data recovery method of the volume is added to the candidate list. The processing is ended.

In step S23006, it is judged whether both the physical apparatus identifiers 80003 of the physical primary volume and the physical secondary volume designate the same external storage or not. When the judgment is affirmative (Yes of step S23006), the processing proceeds to step S23007 and when it is negative (No of step S23006), the processing proceeds to step S23008.

In step S23007 (refer to FIG. 28A), the data recovery method decision processing S230 decides as the data recovery method that the physical primary volume or physical primary volume for recovery 90025 is recovered from the physical secondary volume 90026 by the local copy and this data recovery method of the volume is added to the candidate list.

In step S23008 (refer to FIG. 28B), the data recovery method decision processing S230 decides as the data recovery method that the physical primary volume or physical primary volume for recovery 90027 is recovered from the physical secondary volume 90028 by the remote copy and this data recovery method of the volume is added to the candidate list.

Figure 17:
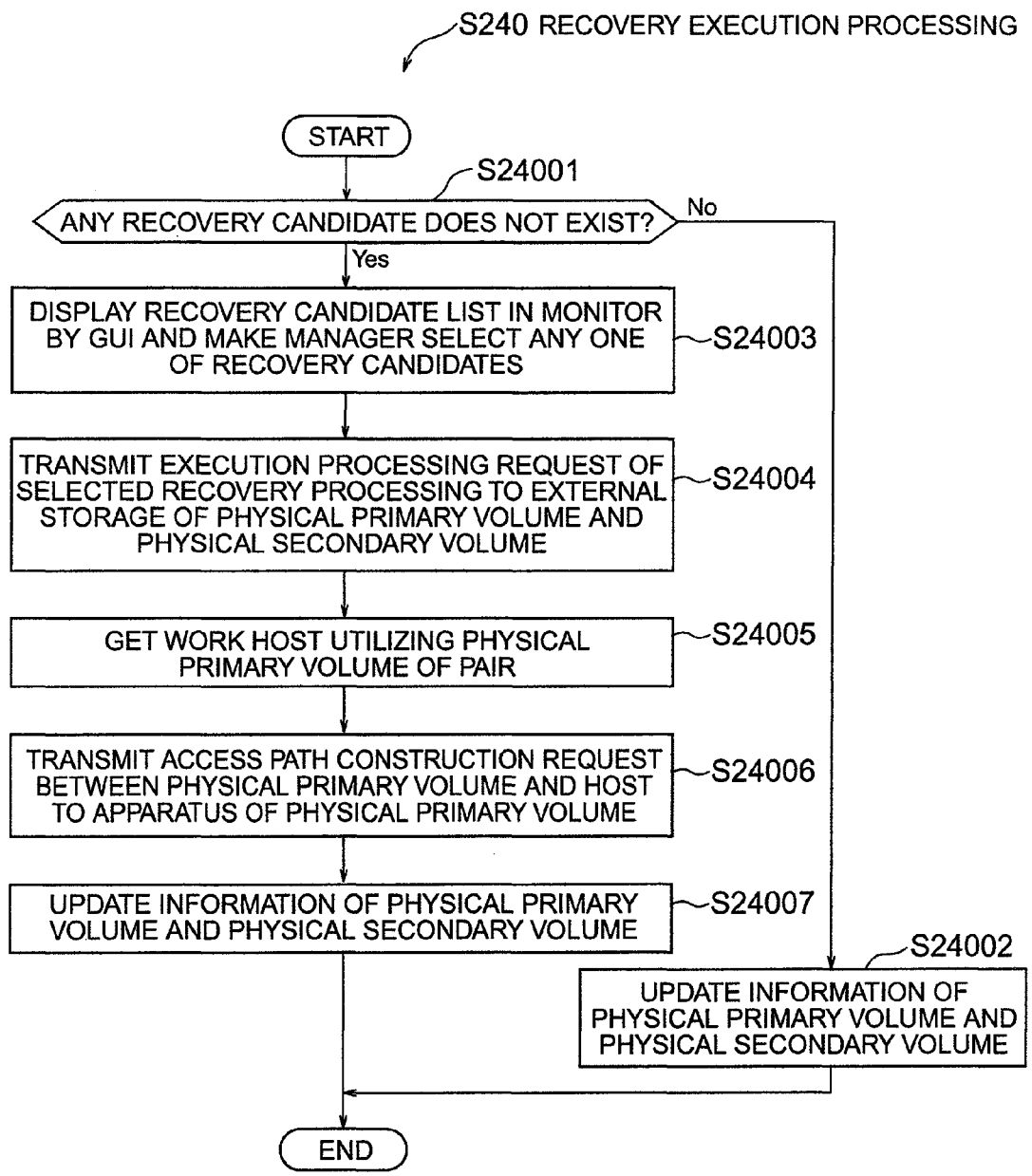
FIG. 17 is a flowchart showing recovery execution processing.

FIG. 17 is a flowchart showing the recovery execution processing. The recovery execution processing S240 is executed by the CPU 930a so as to select any one recovery method from the candidate list of the recovery methods for the pair stored in the work area 970a and selected in step S19001 (refer to FIG. 2) and execute the configuration recovery actually.

First, the candidate list stored in the work area 970a is examined to detect whether the recovery candidates for the pair selected in step S19001 exist and it is judged whether any recovery method does not exist or not (step S24001). When there is no recovery candidate (No of step S24001), the processing proceeds to step S24002. In step 24002, values of the physical apparatus identifier 80003 (refer to FIG. 6) and the physical volume identifier 80004 (refer to FIG. 6) of the virtual primary volume and the virtual secondary volume are deleted in the entry of the volume position information 800a corresponding to the virtual primary volume and the virtual secondary volume constituting the pair selected in step S19001 before execution of recovery and information of the physical primary volume and the physical secondary volume is updated. The processing is ended.

In step S24003, the list of recovery candidates stored in the candidate list is displayed in the monitor 880a to request the manager to select any one of recovery methods by means of the input device 870a. When the manager selects the recovery method by means of the input device 870a, the recovery method is stored in the work area 970a. Then, the processing proceeds to step S24004.

In step 24004, in order to execute the recovery method selected by the manager and stored in the work area 970a actually, an execution request of the recovery method selected by the manager is transmitted through the LAN to the external storage decided by the recovery method selected by the manager. Next, the access path configuration information 830a is utilized to get the work host 500 utilizing the physical primary volume of the pair selected in step S19001 before recovery of the pair selected in step 19001 (step S24005). An access path construction request is transmitted to the external storage of the physical primary volume so as to construct the access path between the physical primary volume of the recovery method selected by the manager and the work host gotten in step S24005 (step S24006).

Finally, the entry of the volume position information 800a corresponding to the virtual primary volume and the virtual secondary volume constituting the pair selected in step S19001 before execution of recovery is updated and the values of the physical apparatus identifier 80003 and the physical volume identifier 80004 of the virtual primary volume and the virtual secondary volume are overwritten by recovered values (step S24007). Then, the processing is ended.

Figure 18:
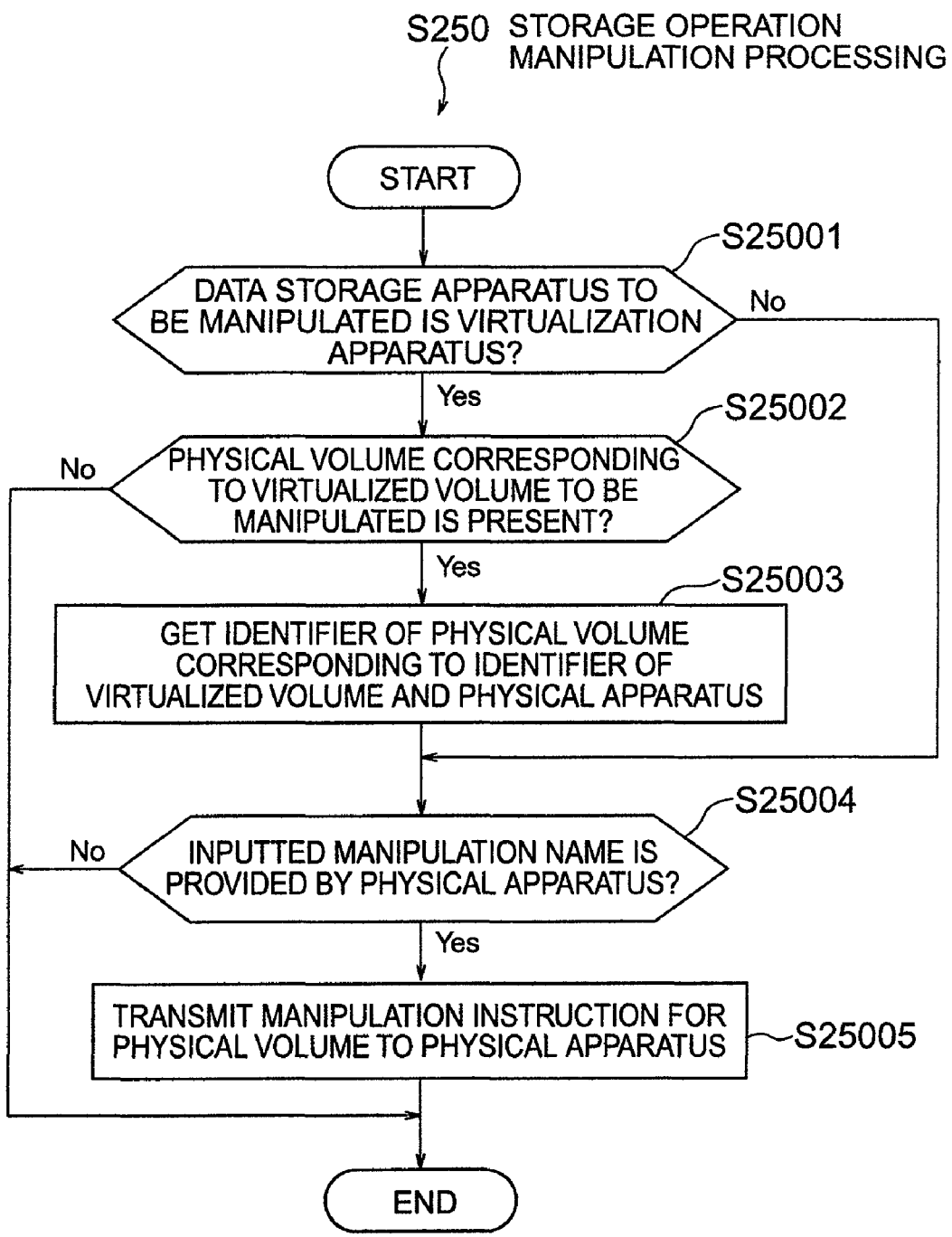
FIG. 18 is a flowchart showing storage operation manipulation processing.

FIG. 18 is a flowchart showing the manipulation processing of storage operation. In the SAN circumstances to which the virtualization apparatus is applied, the manager of the storage operation management server operates the SAN circumstances by not only the manipulation instruction of operation management provided by the physical data storage apparatus (virtualization apparatus and external storage) but the manipulation instruction of virtual operation management virtualized by the virtualization apparatus 600. Moreover, the manipulation instruction of operation designates an apparatus and volume to be operated. Normally, the identifiers of the virtualization apparatus and the virtual volume are designated instead of designating the identifiers of the physical data storage apparatus and the volume. The storage operation manipulation processing S250 is executed at the timing that the manager inputs the manipulation instruction of operation management of the storage management system to the storage management server 100 by means of the input device 870a.

The storage operation manipulation processing S250 is executed by the CPU 930a so as to enable to make operation management as usual by converting the manipulation instruction of virtual operation management and the virtual volume identifier inputted by the manager of the storage management server into the supported manipulation instruction of operation management and the physical volume identifier of the physical data storage apparatus when the virtualization apparatus cannot be utilized due to failure.

First, the storage operation manipulation processing S250 judges whether the identifier of the data storage apparatus designated as an operation management manipulation object by the manager designates the virtualization apparatus or not on the basis of whether the identifier of the data storage apparatus is coincident with any entry of the virtualization apparatus identifier 80001 of the volume position information 800a or not (step S25001). When it is coincident (Yes of step S25001), the processing proceeds to step S25002 and when it is not coincident (No of step S25002), that is, when it is not a request to the virtualization apparatus, mapping processing is not required and accordingly the processing proceeds to step S25004.

In step S25002, the volume position information 800a is utilized to examine whether the physical volume corresponding to the virtual volume to be manipulated is present actually or not. When a value of the physical apparatus identifier 80003 of the physical data storage apparatus holding the physical volume corresponding to the virtual volume is vacant (No of step S25002), that is, when the physical volume corresponding to the virtual volume cannot be recovered, the manipulation instruction of operation management inputted by the manager is judged to be impracticable and the processing is ended. When the physical volume is present (Yes of step S25002), the processing proceeds to step S25003.

In step S25003, the identifier of the physical volume corresponding to the identifier of the virtual volume and the identifier of the physical apparatus are gotten. More particularly, values of the identifier of the virtualization apparatus of the inputted operation management manipulation object and the identifier of the virtual volume are converted into values of the physical apparatus identifier 80003 and the physical volume identifier 80004 by referring to the volume position information 800a.

Next, it is judged whether the manipulation of virtual operation management inputted by the manager is provided by the physical data storage apparatus or not (step S25004). More particularly, the supported manipulation information of operation management 840a is referred to get it. The value of the physical apparatus identifier 80003 gotten in step S25003 is made to be coincident with the physical apparatus identifier 84001 (refer to FIG. 10). Thereafter, the inputted virtual provision manipulation name is made to be coincident with the value of the virtual provision manipulation name 84003 to get the provision manipulation name 84002. When the inputted operation management manipulation name is not provided by the physical apparatus (No of step S25004), that is, when the provision manipulation name 84002 is vacant, the manipulation instruction of operation management inputted by the manager is judged to be impracticable and the processing is ended. When the inputted manipulation name of operation management is provided by the physical apparatus (Yes of step S25004), the processing proceeds to step S25005.

Finally, in step S25005, the manipulation instruction of virtual operation, the identifier of the virtualization apparatus and the identifier of the virtual volume inputted by the manager are converted into the supported manipulation of operation of the physical data storage apparatus, the identifier of the physical data storage apparatus and the identifier of the physical volume and then an execution request of manipulation of operation management is transmitted to the data storage apparatus through the LAN. Then, the processing is ended.

In the embodiment, the storage management server 100 executes the configuration information getting step (S18001 to S18003) for getting configuration information of the virtualization apparatus 600 and configuration information of the external storage 700 periodically, the failure occurrence detection step (S18004 to S18006) for detecting occurrence of failure in the virtualization apparatus 600, the volume recovery method decision step (S200 and S210) for judging whether the physical volume and the pair are recovered or not and deciding candidates of the volume recovery methods when failure occurrence is detected, the data recovery method decision step (S220 and S230) for judging whether data can be recovered with the candidates of the volume recovery methods in the volume recovery method decision step or not to decide a candidate of the data recovery method, and the recovery execution step (S240) for executing, when any combination of the candidates of the volume recovery methods and the candidates of the data recovery methods is selected, the recovery method of the selected combination and making a request for constructing the path between the work host 500 and the external storage to the external storage 700 corresponding to the recovery method of the combination. Thus, when failure occurs in the virtualization apparatus 600, change to the system configuration in which operation is performed without passing through a virtualization apparatus 600 can be made, so that operation of the work host 500 can be resumed promptly.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A storage configuration recovery method of recovering a storage configuration of a non-duplicated virtualization apparatus upon failure, in which post-recovery operation is performed without passing through the non-duplicated virtualization apparatus when failure occurs in the non-duplicated virtualization apparatus in a storage management system in which a plurality of hosts, a plurality of storages including a plurality of volumes and the non-duplicated virtualization apparatus for causing the plurality of storages to be identified with one storage can make communication through a first network and the host, the storages and the non-duplicated virtualization apparatus can make communication with a management server through a second network, wherein the management server comprising:
a configuration information getting step to get configuration information of the non-duplicated virtualization apparatus and configuration information of the storages;
a failure occurrence detection step to detect failure occurrence in the non-duplicated virtualization apparatus;
a volume recovery method decision step to judge whether a physical volume and a pair can be recovered or not when the failure occurrence is detected, and to decide candidates of volume recovery methods;
a data recovery method decision step to judge whether data can be recovered or not with the candidates of the volume recovery methods decided in the volume recovery method decision step, and to decide candidates of data recovery methods; and
a recovery execution step to execute, when any combination of the candidates of the volume recovery methods and the candidates of the data recovery methods is selected, the selected combined recovery method, and to make a request for constructing a path between the storage relevant to the combined recovery method and the host to the storage.

2. The storage configuration recovery method according to claim 1, wherein
the non-duplicated virtualization apparatus performs the following:
providing physical volumes included in the storage and physical volumes included in the non-duplicated virtualization apparatus itself, to the host as virtual volumes;
providing manipulation of physical operation management provided by the storage and manipulation of physical operation management provided by the non-duplicated virtualization apparatus itself, as manipulation of virtual operation management;
preparing pairs of related volumes, between a plurality of virtual volumes; and
enabling to change validity and invalidity of a cache function for each of the virtual volumes if the virtual volumes have the cache function.

3. The storage configuration recovery method according to claim 1, wherein
the management server changes manipulation of virtual operation management realized by the non-duplicated virtualization apparatus to manipulation of physical operation management provided by the storage, when failure occurrence in the non-duplicated virtualization apparatus is detected.

4. The storage configuration recovery method according to claim 1, wherein
in the volume recovery method decision step, the management server judges that the volume is irrecoverable on the basis of volume position information and pair configuration information: when the volume is the virtual volume having no pair constructed and the physical volume is located in the non-duplicated virtualization apparatus; or when both of physical primary volume and physical secondary volume corresponding to virtual primary volume and virtual secondary volume constructing pair are located in the non-duplicated virtualization apparatus.

5. The storage configuration recovery method according to claim 1, wherein
in the volume recovery method decision step, the management server judges that the volume is recoverable on the basis of volume position information and pair configuration information: when a physical primary volume corresponding to a virtual primary volume is located in the non-duplicated virtualization apparatus and a physical secondary volume corresponding to a virtual secondary volume is located in the storage, among virtual primary volumes and virtual secondary volumes constructing the pair.

6. The storage configuration recovery method according to claim 1, wherein
in the volume recovery method decision step, the management server judges that the volume is recoverable on the basis of volume position information and pair configuration information: when a physical volume corresponding to a virtual volume having no pair constructed is located in the storage.

7. The storage configuration recovery method according to claim 1, wherein
in the volume recovery method decision step, the management server judges that the volume is recoverable on the basis of volume position information and pair configuration information: when a physical primary volume corresponding to a virtual primary volume is located in the storage and a physical secondary volume corresponding to a virtual secondary volume is located in the non-duplicated virtualization apparatus, among virtual primary volumes and virtual secondary volumes constructing the pair.

8. The storage configuration recovery method according to claim 5, wherein
in the volume recovery method decision step, the management server judges that the volume is recoverable on the basis of volume position information and pair configuration information: when both of a physical primary volume and a physical secondary volume corresponding to a virtual primary volume and a virtual secondary volume constructing the pair are located in the storage.

9. The storage configuration recovery method according to claim 5, wherein
when it is judged that the volume is recoverable in the volume recovery method decision step, the management server judges whether the physical primary volume having the same size and the same characteristic as those of the physical secondary volume can be prepared in the storage, and the storage provides manipulation of construction operation management of the pair or not, and when the conditions of the judgment are satisfied, the management server prepares a physical primary volume for recovery having the same size and the same characteristic as those of the physical secondary volume located in the storage in the storage, and constructs a local volume between the physical primary volume for recovery and the physical secondary volume, the management server deciding as the volume recovery method that the host utilizes the physical primary volume for recovery, the management server regarding, when the conditions of the judgment are not satisfied, the physical secondary volume as the physical primary volume for recovery, and deciding as the volume recovery method that the host utilizes the physical primary volume for recovery.

10. The storage configuration recovery method according to claim 6 or 7, wherein when it is judged that the volume is recoverable in the volume recovery method decision step, the management server judges whether the physical secondary volume having the same size and the same characteristic as those of the physical primary volume can be prepared in the storage, and the storage provides manipulation of construction operation management of the pair or not, and when the conditions of the judgment are satisfied, the management server prepares a physical secondary volume for recovery having the same size and the same characteristic as those of the physical primary volume located in the storage, and constructs a local pair between the physical primary volume and the physical secondary volume for recovery, the management server deciding as the volume recovery method that the host utilizes the physical primary volume, the management server deciding, when the conditions of the judgment are not satisfied, as the volume recovery method that the host utilizes the physical primary volume.

11. The storage configuration recovery method according to claim 8, wherein when it is judged that the volume is recoverable in the volume recovery method decision step, the management server judges whether both of the physical primary volume and the physical secondary volume are located in the same storage, and the storage provides construction operation management operation of the pair or not, when the conditions of the judgment are satisfied, the management server constructs a local pair between the physical primary volume and the physical secondary volume, and decides as the volume recovery method that the host utilizes the physical primary volume, the management server regarding, when the conditions of the judgment are not satisfied, the physical primary volume as an only physical primary volume or the physical secondary volume as a physical primary volume for recovery, and deciding as the volume recovery method that the host utilizes the physical primary volume for recovery.

12. The storage configuration recovery method according to claim 8, wherein when it is judged that the volume is recoverable in the volume recovery method decision step, the management server constructs, when the physical primary volume and the physical secondary volume are located in different storages and when the different storages provide manipulation of construction operation management of a remote pair, a remote pair between the physical primary volume and the physical secondary volume located between the different storages, and decides as the volume recovery method that the host utilizes the physical primary volume, and when one or both of the storages do not provide manipulation of construction operation management of the remote pair, the management server prepares a physical secondary volume for recovery having the same size and the same characteristic as those of the physical primary volume in the storage located in the physical primary volume, and constructs a local pair between the physical primary volume and the physical secondary volume for recovery, the management server deciding as the volume recovery method that the host utilizes the physical primary volume, alternatively, the management server prepares a physical primary volume for recovery having the same size and the same characteristic as those of the physical secondary volume in the storage located in the physical secondary volume, and constructs a local pair between the physical primary volume for recovery and the physical secondary volume, the management server deciding as the volume recovery method that the host utilizes the physical primary volume for recovery, the management server regarding, when the storage does not provide manipulation of construction operation management of the local pair, the physical primary volume as an only physical primary volume or the physical secondary volume as the physical primary volume for recovery, and deciding as the volume recovery method that the host utilizes the physical primary volume for recovery.

13. The storage configuration recovery method according to claim 1, wherein in the data recovery method decision step, the management server judges that data of a physical primary volume corresponding to a virtual primary volume having no pair constructed is irrecoverable on the basis of cache configuration information and pair configuration information when a cache of the virtual primary volume is valid, and when both of caches of the virtual primary volume and a virtual secondary volume constructing a pair are valid, the management server judges that data of the physical primary volume corresponding to the virtual primary volume and a physical secondary volume corresponding to the virtual secondary volume are irrecoverable on the basis of the cache configuration information and the pair configuration information.

14. The storage configuration recovery method according to claim 1, wherein in the data recovery method decision step, the management server judges that data of a physical primary volume is recoverable on the basis of volume position information, cache configuration information and pair configuration information when a physical secondary volume is located in the storage, a cache of the physical secondary volume is invalid, the physical secondary volume is not constructed in the volume recovery method decision step and the physical primary volume is located in the storage.

15. The storage configuration recovery method according to claim 1, wherein in the data recovery method decision step, the management server judges that data of a physical secondary volume is recoverable on the basis of volume position information, cache configuration information and pair configuration information when a physical primary volume is located in the storage, a cache of the physical primary volume is invalid, the physical primary volume is not constructed in the volume recovery method decision step and the physical secondary volume is located in the storage.

16. The storage configuration recovery method according to claim 14, wherein when it is judged that data is irrecoverable in the data recovery method decision step, the management serve utilizes, when the pair is constructed as a remote pair, a local copy to decide as the data recovery method that data of the physical primary volume is recovered from the physical secondary volume on the basis of volume position information and pair configuration information, and when the pair is constructed as a remote pair, the management server utilizes a remote copy to decide as the data recovery method that data of the physical primary volume is recovered from the physical secondary volume on the basis of volume position information and pair configuration information.

17. The storage configuration recovery method according to claim 15, wherein when it is judged that data is recoverable in the data recovery method decision step, the management server utilizes, when the pair is constructed as a local pair, a local copy to decide as the data recovery method that data of the physical secondary volume is recovered from the physical primary volume on the basis of volume position information and pair configuration information, and when the pair is constructed as a remote pair, the management server utilizes a remote copy to decide as the data recovery method that data of the physical secondary volume is recovered from the physical primary volume on the basis of volume position information and pair configuration information.

18. A storage management system for recovering a storage configuration of a non-duplicated virtualization apparatus upon failure, in which a plurality of hosts, a plurality of storages including a plurality of volumes and the non-duplicated virtualization apparatus for causing the plurality of storages to be identified as one storage can make communication through a first network and the host, the storages and the non-duplicated virtualization apparatus can make communication with a management server through a second network, wherein the management server comprises:

configuration information getting means to get configuration information of the non-duplicated virtualization apparatus and configuration information of the storages;

volume recovery method decision means to judge whether a physical volume and a pair can be recovered or not when failure occurrence in the non-duplicated virtualization apparatus is detected and to decide candidates of volume recovery methods;

data recovery method decision means to judge whether data can be recovered or not with the candidates of the volume recovery methods decided in the volume recovery method decision means, and to decide candidates of data recovery methods; and recovery execution means to execute, when any combination of the candidates of the volume recovery methods and the candidates of the data recovery methods is selected, the selected combined recovery method, and to make a request for constructing a path between the storage relevant to the combined recovery method and the host to the storage.

19. The storage management system according to claim 18, wherein the management server judges that the volume can be recovered on the basis of volume position information and pair configuration information: when any one or both of a physical primary volume corresponding to a virtual primary volume and a physical secondary volume corresponding to a virtual secondary volume, the virtual primary volume and the virtual secondary volume constructing the pair, are located in the storage.

* * * * *